US008042126B2

(12) United States Patent
Sato

(10) Patent No.: US 8,042,126 B2
(45) Date of Patent: Oct. 18, 2011

(54) DISC PLAYER

(75) Inventor: Katsuhisa Sato, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 543 days.

(21) Appl. No.: 12/224,884

(22) PCT Filed: Feb. 14, 2007

(86) PCT No.: PCT/JP2007/052578
§ 371 (c)(1),
(2), (4) Date: Sep. 9, 2008

(87) PCT Pub. No.: WO2007/108255
PCT Pub. Date: Sep. 27, 2007

(65) Prior Publication Data
US 2009/0049461 A1    Feb. 19, 2009

(30) Foreign Application Priority Data

Mar. 15, 2006  (JP) .................................. 2006-071092
Mar. 15, 2006  (JP) .................................. 2006-071093
Mar. 24, 2006  (JP) .................................. 2006-082553

(51) Int. Cl.
*G11B 17/04* (2006.01)
(52) U.S. Cl. ........................................................ 720/619
(58) Field of Classification Search .................... 720/619
See application file for complete search history.

(56) References Cited

U.S. PATENT DOCUMENTS

| 5,828,641 | A | 10/1998 | Abe et al. | |
|---|---|---|---|---|
| 6,388,972 | B1 * | 5/2002 | Saitou et al. | 720/673 |
| 6,542,453 | B1 | 4/2003 | Yamada et al. | |
| 6,741,541 | B2 * | 5/2004 | Akatani et al. | 720/661 |
| 7,117,509 | B2 * | 10/2006 | Makisaka et al. | 720/619 |
| 7,171,675 | B2 | 1/2007 | Satoh | |
| 7,293,274 | B2 | 11/2007 | Satoh | |
| 7,506,346 | B2 * | 3/2009 | Ogasawara et al. | 720/624 |
| 7,814,504 | B2 * | 10/2010 | Aoki et al. | 720/624 |
| 2005/0289563 | A1 | 12/2005 | Song et al. | |

FOREIGN PATENT DOCUMENTS

| EP | 0 439 853 | 8/1991 |
|---|---|---|
| EP | 1 087 390 | 3/2001 |
| JP | U-02-42240 | 3/1990 |
| JP | A-03-280257 | 12/1991 |

(Continued)

OTHER PUBLICATIONS

Office Action mailed on Jul. 7, 2009 in a related Japanese patent application No. 2008-506184, corresponding to U.S. Appl. No. 12/224,871 (English translation enclosed).

(Continued)

*Primary Examiner* — Mark Blouin
(74) *Attorney, Agent, or Firm* — Posz Law Group, PLC

(57) ABSTRACT

There is provided a disc player which can be reduced in the number of parts and in cost, and which can be designed to be thin and provided with a function of sufficiently self-holding a lock state.

A drive unit 9 is constructed by a base plate 13 and a swing plate 17 for pinching a disc in cooperation with the base plate 13, and a lock mechanism 260 is disposed between the base plate 13 and the swing plate 17, and the operation of the lock mechanism 260 is interlocked with the operation of the swing plate 17.

10 Claims, 25 Drawing Sheets

FOREIGN PATENT DOCUMENTS

| | | |
|---|---|---|
| JP | A-4-090163 | 3/1992 |
| JP | A-05-101505 | 4/1993 |
| JP | 06-058450 | 8/1994 |
| JP | A-07-085564 | 3/1995 |
| JP | A-8-227549 | 9/1996 |
| JP | A-8-241567 | 9/1996 |
| JP | A-11-110876 | 4/1999 |
| JP | A-2000-067496 | 3/2000 |
| JP | A-2000-57665 | 5/2000 |
| JP | A-2001-110117 | 4/2001 |
| JP | A-2001-283494 | 10/2001 |
| JP | A-2002-050102 | 2/2002 |
| JP | A-2003-059151 | 2/2003 |
| JP | A-2003-077198 | 3/2003 |
| JP | A-2003-123358 | 4/2003 |
| JP | A-2003-123359 | 4/2003 |
| JP | A-2003-208744 | 7/2003 |
| JP | A-2003-257110 | 9/2003 |
| JP | A-2003-317355 | 11/2003 |
| JP | A-2004-206871 | 7/2004 |
| JP | A-2005-18869 | 1/2005 |
| JP | A-2005-135457 | 5/2005 |
| JP | A-2005-251363 | 9/2005 |
| JP | A-2006-012242 | 1/2006 |
| WO | WO 01/91119 | 11/2001 |

OTHER PUBLICATIONS

Office Action dated Jun. 28, 2010 in a related Chinese patent application No. 200780009155.X, corresponding to U.S. Appl. No. 12/224,878 (English translation enclosed).

International Search Report of the International Searching Authority mailed on Mar. 20, 2007 for the corresponding International patent application No. PCT/JP2007/052578.

International Preliminary Report on Patentability dated Sep. 25, 2008 in corresponding PCT application No. PCT/JP2007/051361.

International Preliminary Report on Patentability dated Sep. 25, 2008 in corresponding PCT application No. PCT/JP2007/051360.

U.S. Appl. No. 12/224,871, filed Sep. 9, 2008, Sato.

U.S. Appl. No. 12/224,878, filed Sep. 9, 2008, Sato et al.

International Search Report of the International Searching Authority mailed on Apr. 24, 2007 for a related International patent application No. PCT/JP2007/051360, corresponding to U.S. Appl. No. 12/224,871.

International Search Report of the International Searching Authority mailed on Apr. 24, 2007 for a related corresponding International patent application No. PCT/JP2007/051361, corresponding to U.S. Appl. No. 12/224,878.

Office Action dated Feb. 8, 2011 issued from Japan Patent Office in corresponding JP application No. 2006-071092. (English translation enclosed).

Office Action dated Feb. 8, 2011 from Japan Patent Office in corresponding JP application No. 2006-071093. (English translation enclosed).

Extended European Search Report dated Apr. 7, 2011 in corresponding European patent application No. 07707592.7 (corresponding to U.S. Appl. No. 12/224,878).

Extended European Search Report dated Mar. 30, 2011 in corresponding European patent application No. 07707591.9 corresponding to U.S. Appl. No. 12/224,871.

Extended European Search Report dated Mar. 29, 2011 in corresponding European patent application No. 07708380.6.

* cited by examiner

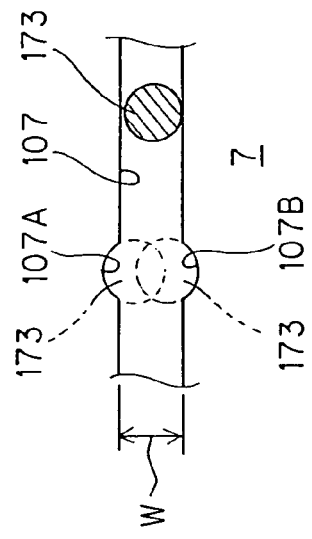
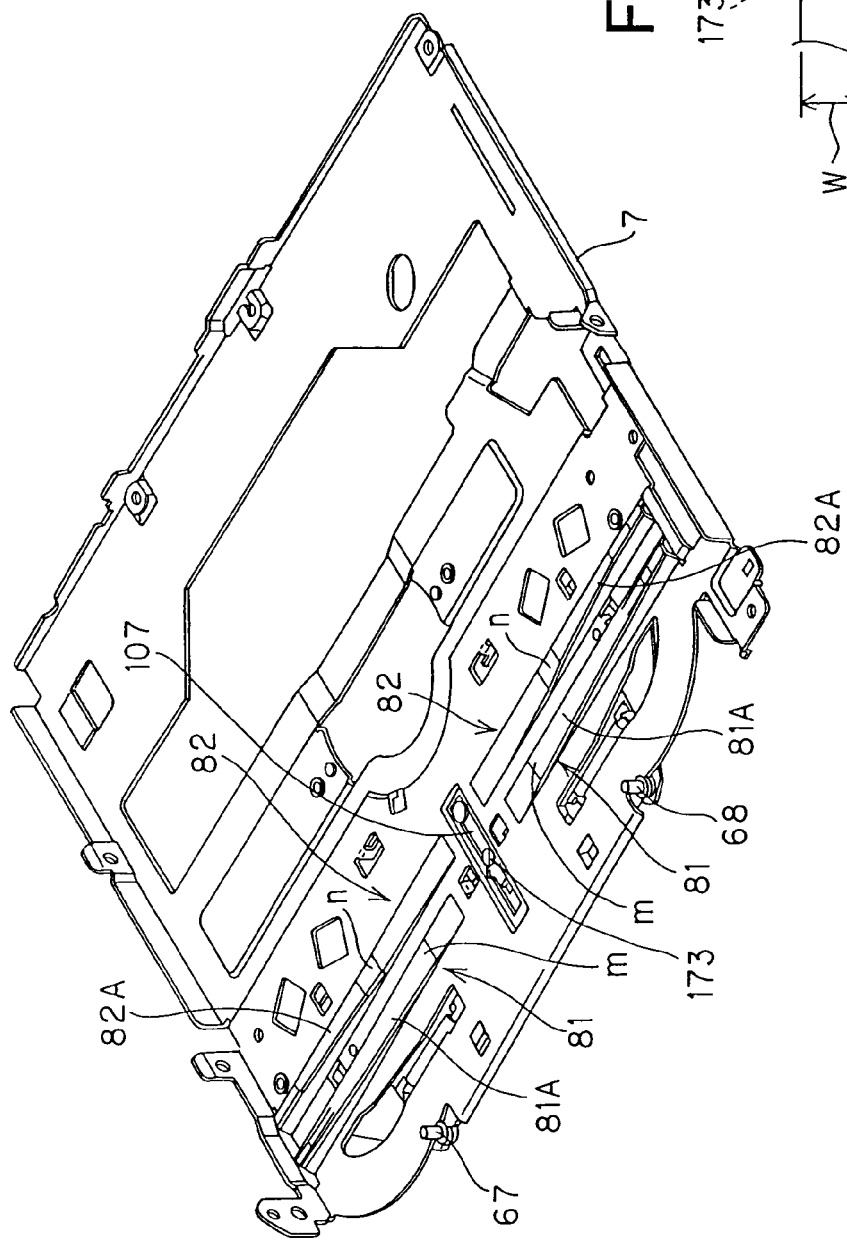

DISC PLAYER

CROSS REFERENCE TO RELATED APPLICATIONS

This application is a U.S. national stage application of PCT/JP2007/052578 filed on Feb. 14, 2007, and claims priority to, and incorporates by reference, Japanese Patent Application Nos. JP2006-071092 and JP2006-071093 filed on Mar. 15, 2006 and JP2006-082553 filed on Mar. 24, 2006. This application is also related to U.S. applications Ser. No. 12/224,871, entitled "DISC PLAYER," and Ser. No. 12/224,878, entitled "DISC PLAYER, AND CONTROL METHOD AND CONTROL PROGRAM FOR THE SAME," filed simultaneously on Sep. 9, 2008 with the present application.

FIELD OF THE INVENTION

The present invention relates to a disc player that is mounted in a vehicle and reproduces information of a recording medium disc such as CD (compact disc), DVD (digital versatile disc) or the like.

BACKGROUND ART

A conventional disc player supports a drive unit inside a chassis while floating the drive unit, and loads a disc to the drive unit to reproduce the disc. In addition, at least at a disc eject or loading standby time, the disc player releases the floating of the drive unit and locks the drive unit to the chassis (for example, see Patent Document 1).
Patent Document 1: WO/2001/091119

DISCLOSURE OF THE INVENTION

Problem to be solved by the Invention

Various proposals have been made for this type of lock mechanism. In the conventional proposals, the structure is complicated, the number of parts is increased and the cost is increased. In addition, the thickness of the disc player is increased because the structure concerned is contained in the disc player.

Furthermore, this type of lock mechanism is required to be provided with a function of self-holding the lock state when an impact is applied to the chassis. Various proposals have been hitherto made to secure this function, however, these proposals complicate the structure and increase the cost.

Therefore, an object of the present invention is to solve the problem of the conventional techniques described above, and provide a disc player which can be reduced in the number of parts and in cost by making the construction thereof simpler than the conventional ones and also designed to be thinner. Furthermore, the present invention has an object to provide a disc player that is provided with a function of sufficiently self-holding a lock state.

Means of Solving the Problem

According to the present invention, a disc player in which a drive unit is supported inside a chassis while floating the drive unit and a disc is loaded to the drive unit to reproduce the disc and which is provided with a lock mechanism for releasing the floating of the drive unit at least under a disc eject or loading standby state to lock the drive unit to the chassis, is characterized in that the drive unit comprises a base plate and a swing plate for pinching the disc in cooperation with the base plate, the lock mechanism is disposed between the base plate and the swing plate, and the operation of the lock mechanism is interlocked with the operation of the swing plate.

In this construction, the operation of the lock mechanism is interlocked with the operation of the swing plate. Therefore, an extra actuator or the like for operating the lock mechanism is unnecessary, so that the construction can be simplified, the number of parts can be reduced and the cost can be reduced Furthermore, the structure is simplified, and thus the thickness of the disc player can be reduced.

In this case, the lock mechanism may be unlocked interlockingly with a closing operation of the swing plate. Furthermore, the lock mechanism comprises a cam member and a lock member, the cam member is mounted on the base plate so as to be freely rotatable, gears are formed integrally with a base end and a free end of the cam member, the gear at the base end is engaged with a gear formed on the swing plate, the gear at the free end is engaged with a gear of the lock member, the lock member is freely rotatably mounted on the base plate, a free end of the lock member is projected from an opening formed in the swing plate, the free end is brought into contact with the back surface of the chassis to be locked, and the free end is turned down interlockingly with the closing operation of the swing plate. Furthermore, the lock mechanism may be disposed at one side of the drive unit.

In this construction, the lock member of the lock mechanism is turned down interlockingly with the opening/closing operation of the swing plate, so that an extra actuator for erecting the lock member is unnecessary and the lock mechanism can be operated with a simple construction.

In this construction, another lock mechanism is mounted in the drive unit so as to be disposed on the chassis and reciprocable in the forward and backward direction of the drive unit, the other lock mechanism is equipped with a trigger cam having a rack gear, a gear plate which is engaged with the rack gear of the trigger cam and swung interlockingly with the reciprocating motion of the trigger cam, a lock plate which reciprocates in the right-and-left direction of the drive unit interlockingly with the swing operation of the gear plate, and a lock piece provided to the lock plate, the trigger cam is moved in the forward and backward direction, the lock plate is reciprocated in the right-and-left direction to fit a fixed piece fixed to the drive unit into a groove, and the drive unit is locked to the chassis.

In this construction, the trigger cam can reciprocate in the forward and backward direction of the drive unit, the lock plate interlocked with the reciprocating operation of the trigger cam can reciprocate in the right-and-left direction of the drive unit. Therefore, even when force acts on the lock piece so as to make the lock piece escape from the groove of the fixed piece, the acting direction of the force is perpendicular to the operating direction of the trigger cam and thus this force does not contribute to the reciprocating operation of the trigger cam. Accordingly, unintentional force acts on the lock piece so as to make the lock piece escape from the groove of the fixed piece, the lock is not released, and the lock state of the drive unit is sufficiently self-held.

In this case, the rack gear may extend in the forward and backward direction of the drive unit. Furthermore, the other lock mechanism may be disposed at one side of the drive unit. Still furthermore, the other lock mechanism may be unlocked interlockingly with the closing operation of the swing plate.

Effect of the Invention

In the present invention, the operation of the lock mechanism is interlocked with the operation of the swing plate.

Therefore, an extra actuator for operating the lock mechanism or the like is unnecessary. Therefore, the construction can be simplified, the number of parts can be reduced and the cost can be reduced. Furthermore, the structure can be simplified, and thus the thickness of the disc player can be reduced.

Furthermore, in the present invention, the trigger cam can reciprocate in the forward and backward direction of the drive unit, the lock plate interlocked with the reciprocating operation of the trigger cam can reciprocate in the right-and-left direction of the drive unit. Therefore, even when force acts on the lock piece so as to make the lock piece escape from the groove of the fixed piece, the acting direction of the force is perpendicular to the operating direction of the trigger cam and thus this force does not contribute to the reciprocating operation of the trigger cam. Accordingly, unintentional force acts on the lock piece so as to make the lock piece escape from the groove of the fixed piece, the lock is not released, and the lock state of the drive unit is sufficiently self-held.

BRIEF DESCRIPTION OF THE DRAWINGS

[FIG. 15] is a perspective view when the upper chassis is viewed from the back side.

Figure 1:
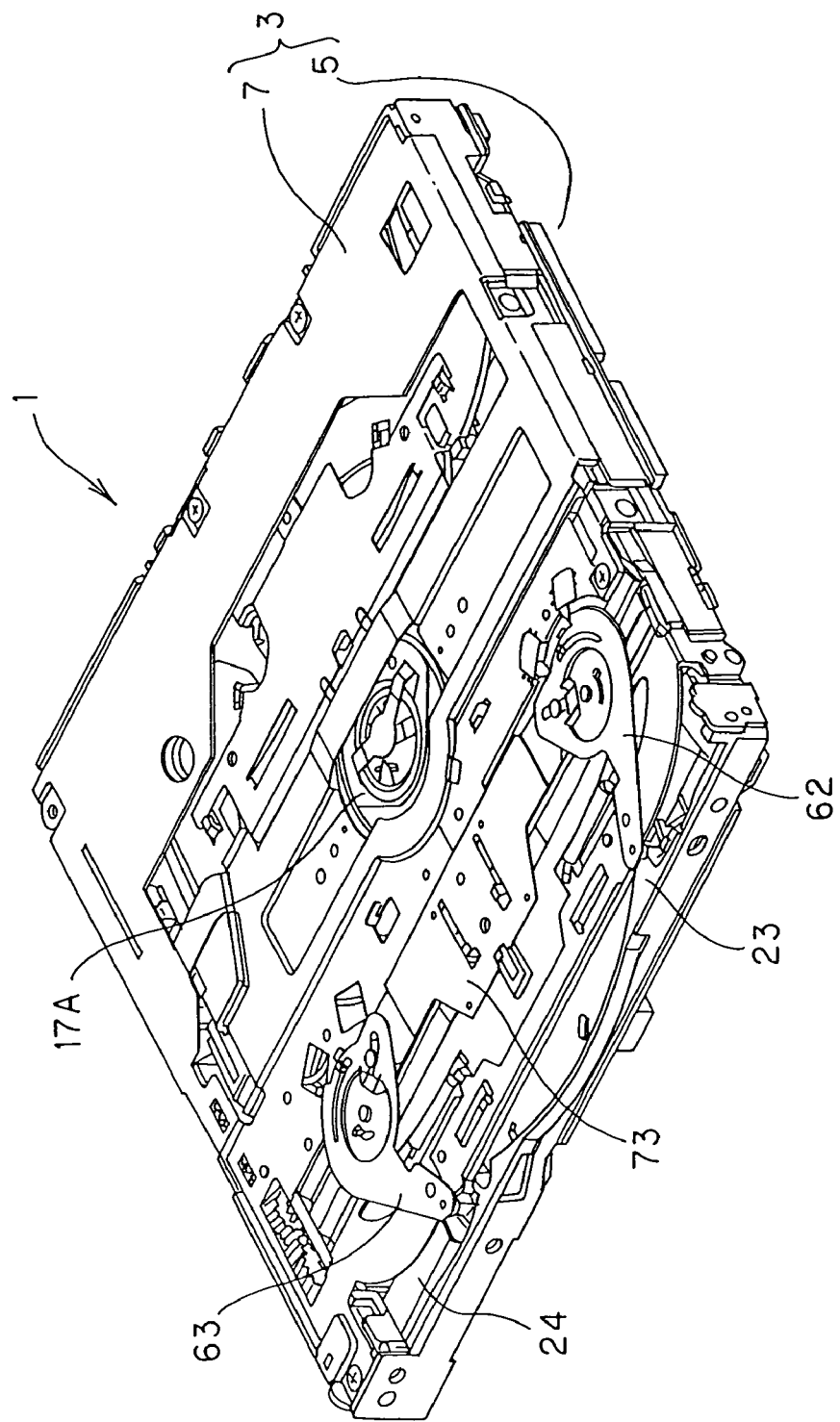
[FIG. 1] is a perspective view showing a first embodiment of a disc player according to the present invention.

DESCRIPTION OF REFERENCE NUMERALS 1 main body
3 chassis
5 lower chassis
7 upper chassis
9 drive unit
13 base plate
17 swing plate
23 insertion port
41 trigger cam
41R rack gear
92 gear plate
92G gear
96 lock plate
96D lock piece
99 fixed piece
99A groove
111 cam member
121 lock member
121 free end
250 first lock mechanism
260 second lock mechanism A first embodiment of the present invention will be described with reference to the drawings.

FIG. 1 is a perspective view showing the outlook of a disc player according to an embodiment of the present invention. Recording discs which are different in size, for example, 8 cm, 12 cm, etc. in diameter such as CD, DVD or the like are pulled into this disc player, and information recorded in the discs is reproduced. 1 represents a main body, and the main body 1 is equipped with a metal chassis. The chassis 3 is equipped with a lower chassis 5 and an upper chassis covering the upper side of the lower chassis 5. As omitted from FIG. 1, a loading mechanism for loading a disc, a clamper mechanism for clamping the disc, a drive mechanism for driving the disc, etc. are provided in the chassis 3.

Figure 3:
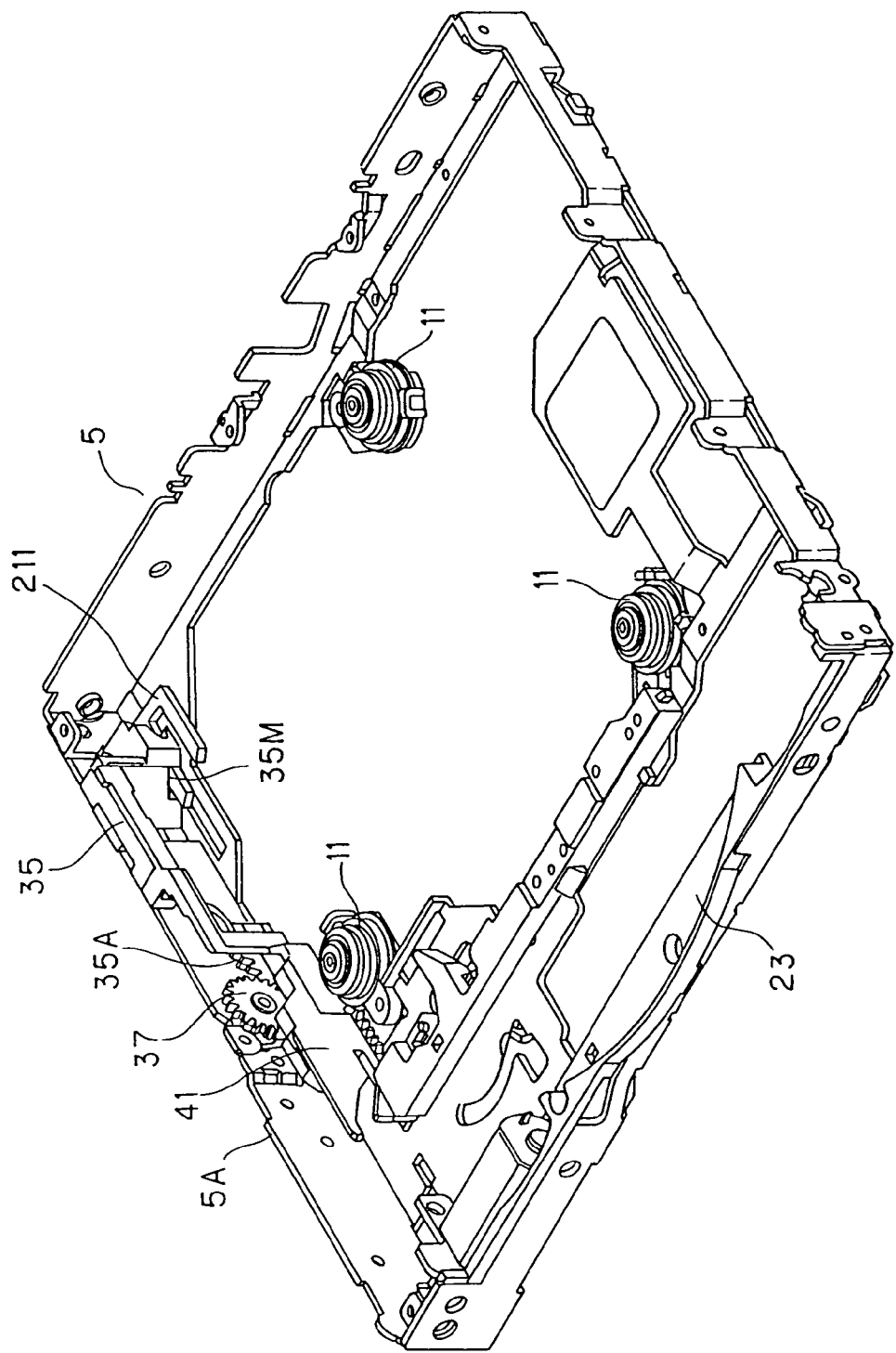
[FIG. 3] is a perspective view of a lower chassis.
Figure 4:
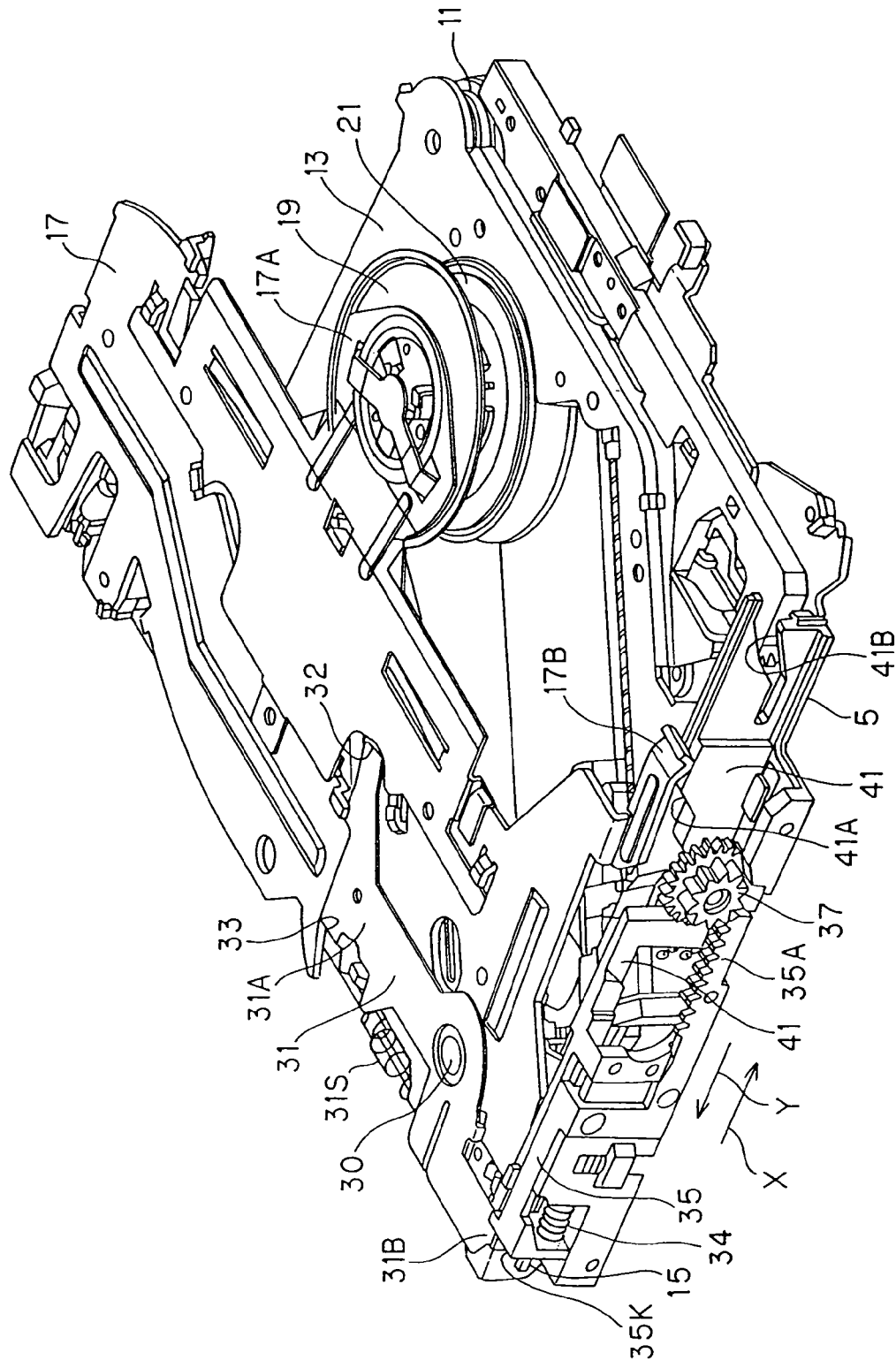
[FIG. 4] is a left-hand perspective view when a drive unit is secured to the lower chassis.
Figure 5:
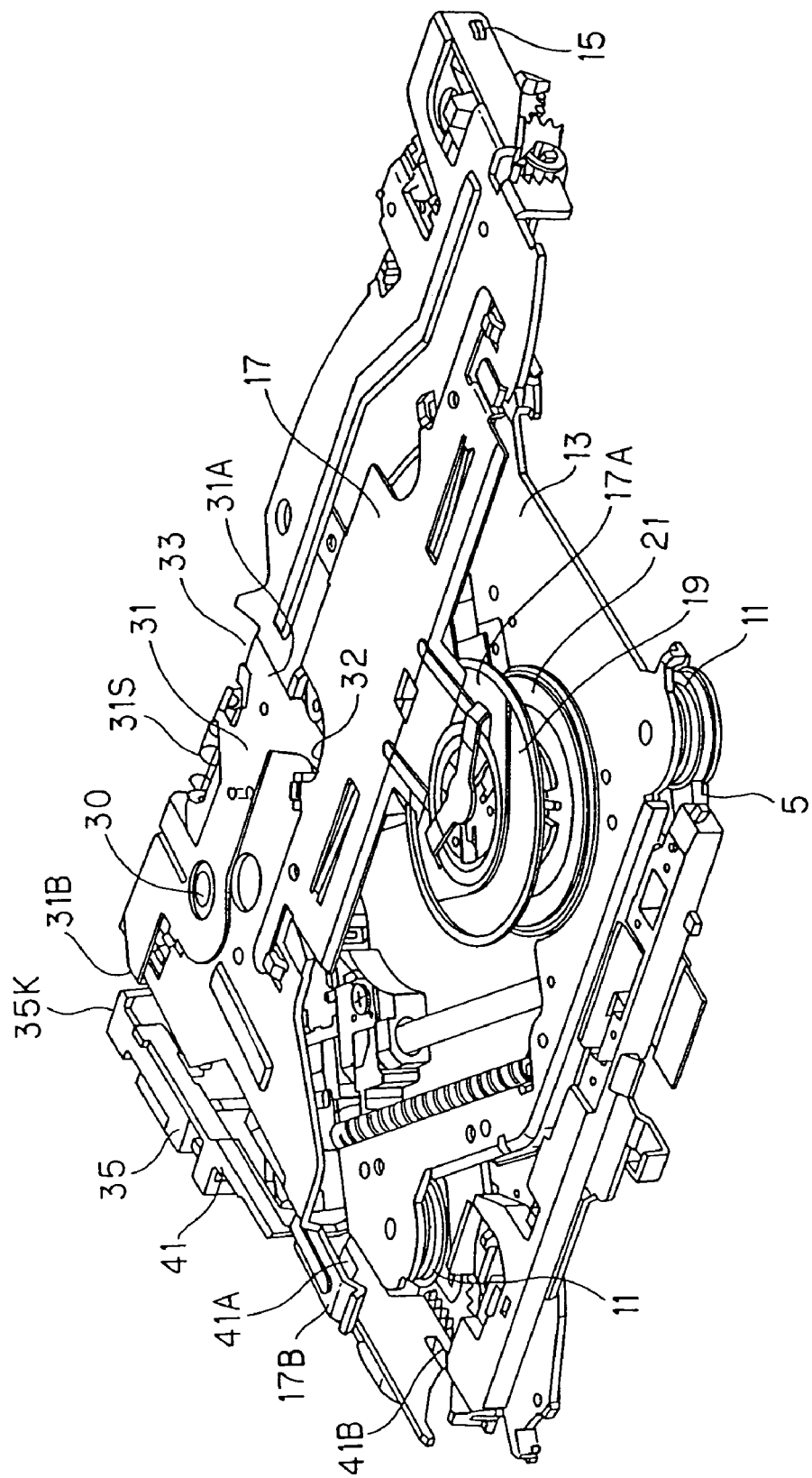
[FIG. 5] is a right-side perspective view when the drive unit is secured to the lower chassis.

FIG. 3 is a perspective view when the upper chassis 7 is detached, FIG. 3 is a perspective view of the lower chassis 5, FIG. 4 is a left-hand perspective view when the drive unit 9 is attached to the lower chassis 5, and FIG. 5 is a right-hand perspective view when the drive unit 9 is attached to the lower chassis 5.

Figure 2:
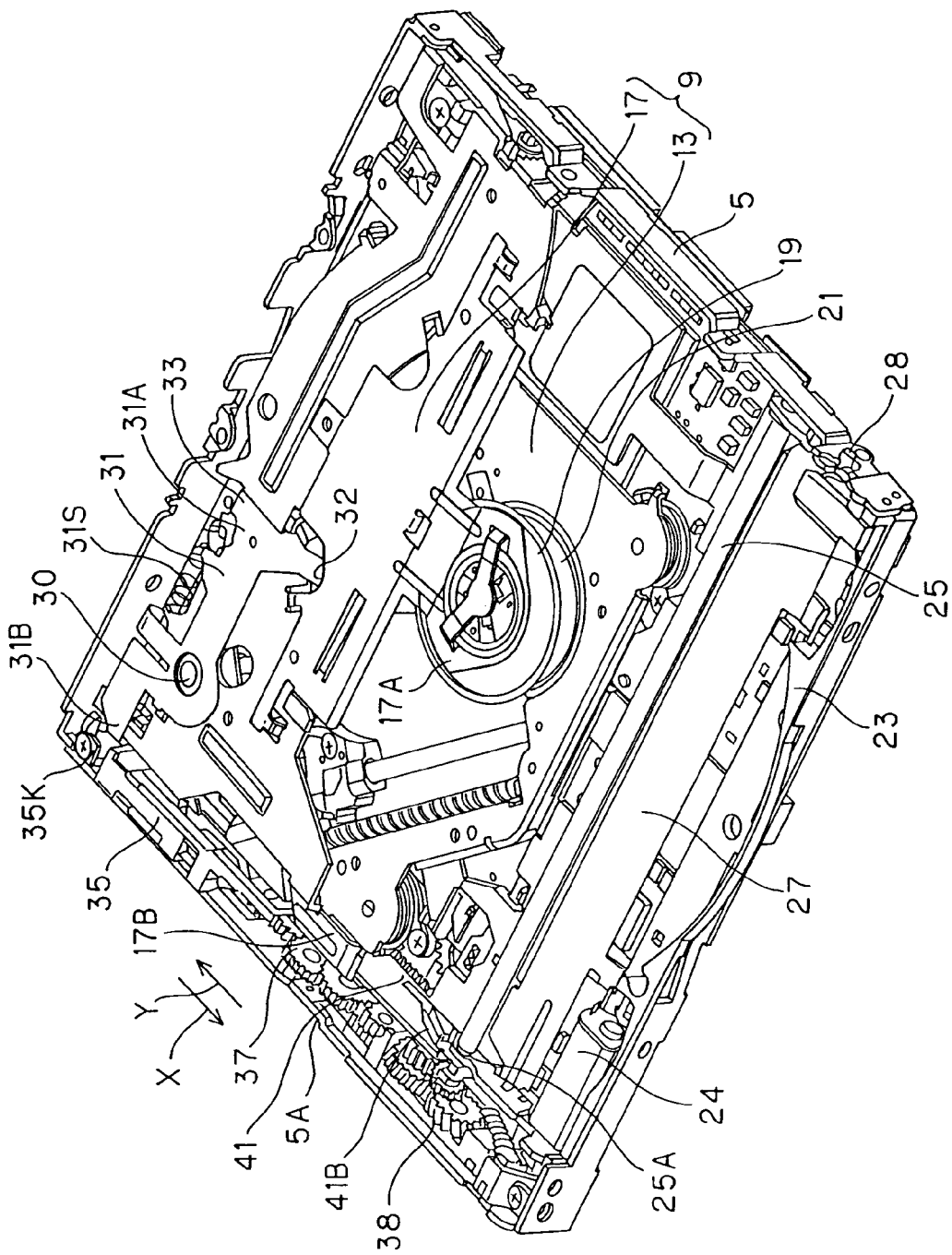
[FIG. 2] is a perspective view when an upper chassis is detached.

As shown in FIG. 3, the lower chassis 5 is designed in a frame-shape, and three antivibration structures 11 each having a damper and a spring are secured to the lower chassis 5. As shown in FIG. 2, the drive unit 9 which a clamper mechanism and a drive mechanism are integrated is mounted on the antivibration structures 11 and supported while floated.

As shown in FIGS. 4 and 5, the drive unit 9 is equipped with a base plate 13, and a swing plate 17 which is joined to both the sides of the rear endportion of the base plate 13 through a hinge 15 and urged by a spring so as to close the tip end 17A and pinches a disc in cooperation with the base frame 13. A rotational plate 19 is mounted at the tip 17A of the swing plate 17, and a magnet-contained turntable 21 facing the rotational plate 19 is supported by the base plate 13. As described later, when a disc is inserted and the swing plate 17 is closed, the disc is pinched by the rotational plate 19 of the tip 17A and the turntable 21 so as to be rotatable.

As shown in FIG. 1, a laterally elongated disc insertion port 23 is formed at the front side of the main body 1, and a loading roller 25 which is driven by a motor 24 at the front portion of the lower chassis 5 is provided to the back side of the insertion port as shown in FIG. 2.

When the disc is detected, this loading roller 25 is driven by the motor 24 to pull the disc concerned into the main body 1. The loading roller 25 is supported by a roller support plate 27, and the base portion of the roller support plate 27 is joined to the lower chassis 5 by a hinge pin 28. Accordingly, the loading roller 25 is displaced in height position by the swing motion of the roller support plate 27.

A trigger plate 31 is freely swingably supported at the left rear portion of the upper surface of the drive unit 9 through a support pin 30. The trigger plate 31 is urged in a counterclockwise direction by a spring 31S, and two pawl portions 32 and 33 which are bent to the inside of the drive unit 9 are integrally formed at one end 31a of the trigger plate 31. An 8-cm disc which is pulled in can abut against one pawl portion 32, and a 12-cm disc which is pulled in can abut against the other pawl potion. The other end 31B of the trigger plate 31 extends to the outside of the drive unit 9, and is bent downwardly along the outer wall of the drive unit 9. The other end 31B abuts against the rear surface 35K of a trigger 35 disposed on the lower chassis 5. When a disc is pulled into the main body 1 and abuts against any pawl portion 32, 33 and the trigger plate 31 is counterclockwise turned, the trigger plate 31 the trigger plate 31 makes the trigger 35 move forwardly (in the direction of an arrow X). This trigger 35 is normally urged to the other end 31B side (in the direction of an arrow Y) by a spring (not shown).

As shown in FIG. 4, a part of the trigger 35 extends to the front side of the bottom portion of the lower chassis 5, and a trigger rack gear 35A is integrally formed on the upper surface of this extension portion. A final gear 37 (see FIG. 3) which is mounted on the side plate 5A of the lower chassis 5 is disposed at the front side of the trigger rack gear 35A. The final gear 37 is normally mounted at such a position that it is not engaged with the trigger rack gear 35A, and it is engaged with the trigger rack gear 35A only when the trigger plate 31 is turned and thus the trigger 35 moves forwardly. As shown in FIG. 2, the final gear 37 is jointed to the motor 24 at the front potion of the lower chassis 5 through a gear train 38 comprising plural gears. If the trigger rack gear 35A and the final gear 37 are temporarily engaged with each other at the driving time of the motor 24, the trigger 35 moves forwardly by the driving force of the final gear 37 and the motor 24.

As shown in FIG. 4, a trigger cam 41 is integrally joined to the trigger 35. The trigger cam 41 extends inside the gear train 38 in parallel to the gear train 38, and a cam face 41A whose front portion is gradually stepwise higher is formed on the upper surface of the middle portion of the trigger cam 41. An upwardly-climbing stepwise slope groove 41B which guides the driving shaft 25A (see FIG. 2) of the loading roller 25 is formed at the tip portion of the trigger cam 41. A part 17B of the swing plate 17 of the drive unit 9 abuts against the cam face 41A.

After the trigger 35 engages with the final gear 37 and moves to the stroke end, the trigger cam 41 is pushed out, the rack of the trigger cam 41 engages with the final gear 37 and the trigger cam 41 moves forwardly (in the direction of the arrow X).

When the trigger cam 41 moves forwardly (in the direction of the arrow X), the cam face 41A with which the part 17B concerned is in contact is gradually lowered, and the swing plate 17 is swung in the closing direction by the spring force. When the trigger cam 41 further moves forwardly and thus moves to the forward movement limit position, the part 17B is completely separated from the cam face 41A, and clamping of the disc by the rotational plate 19 of the tip of the swing plate 17 and the turntable 21 is completed. At the same time, by the release of the fitting between the part 17B of the swing plate 17 and the cam face 41A, the drive unit 9 is completely floated and supported through the three antivibration structures 11. At the same time, the driving shaft 25A of the loading roller 25 moves to a low position along the slope groove 41B, and the loading roller 25 is displaced to a lower position by the swinging motion of the roller support plate 27, so that the loading roller 25 is separated from the lower surface of the disc under clamping. Under this state, the turntable 21 is rotated to reproduce the disc.

When the motor 24 is reversely rotated, the trigger 35 and the trigger cam 41 move backwardly (in the direction of the Y arrow) through the gear train 38, the final gear 37 and the trigger rack gear 35A. In connection with this movement, the cam face 41A with which the part 17B concerned is in contact is gradually higher, and the swing plate 17 is pushed up against the spring force and swung in the opening direction. Furthermore, when the trigger 35 and the trigger cam 41 further backwardly move and the trigger cam 41 moves to the backward-movement limit position, the part 17B runs upon the highest position of the cam face 41A, and a disc inserting gap is formed between the rotational plate 19 of the tip of the swing plate 17 and the turntable 21.

At the same time, the driving shaft 25A of the loading roller 25 gradually moves to a higher position along the slope groove 41B, and at the backward-movement limit position, the loading roller 25 is displaced to a high position until it comes into contact with the lower surface of the disc by the swing motion of the roller support plate 27. Then, the disc is ejected by the loading roller 25.

After the disc is ejected, the display player is set to a loading standby state. Under the eject or loading standby state, the drive unit 9 is locked to the chassis 3 by a lock mechanism described next.

Next, the lock mechanism of the drive unit 9 will be described.

Figure 6:
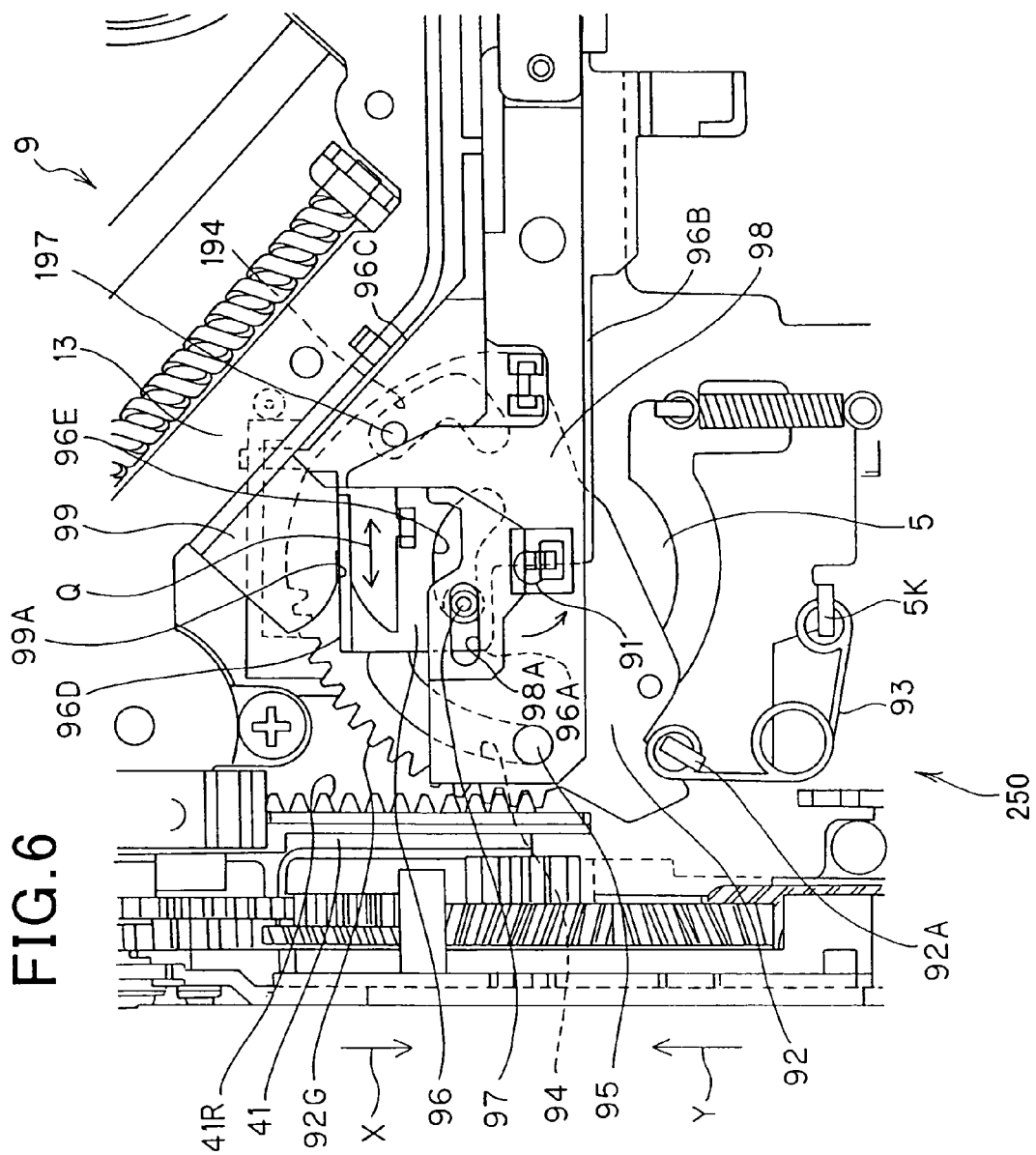
[FIG. 6] is a plan view showing a lock state of a first lock mechanism.
Figure 7:
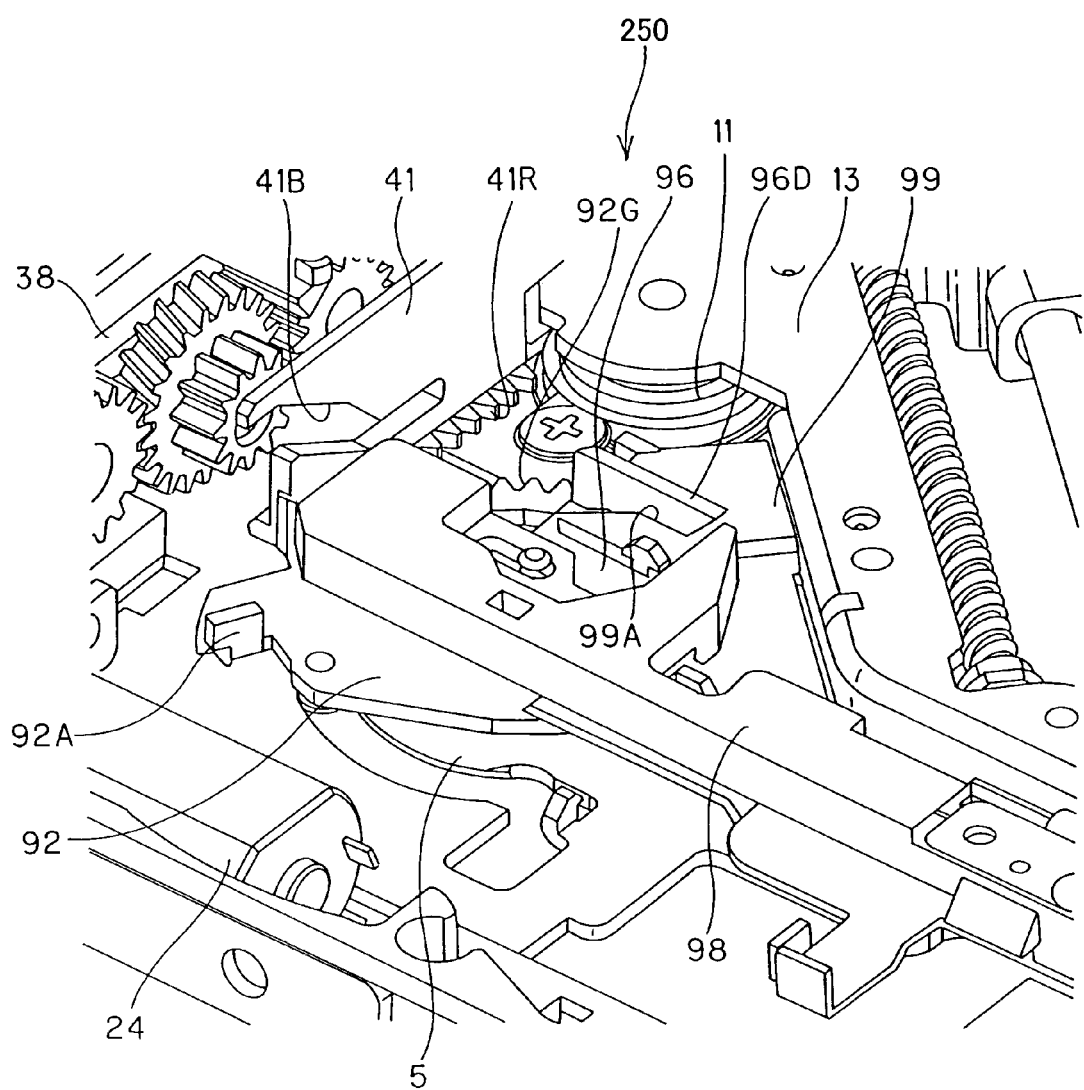
[FIG. 7] is a perspective view showing the lock state of the first lock state.
Figure 8:
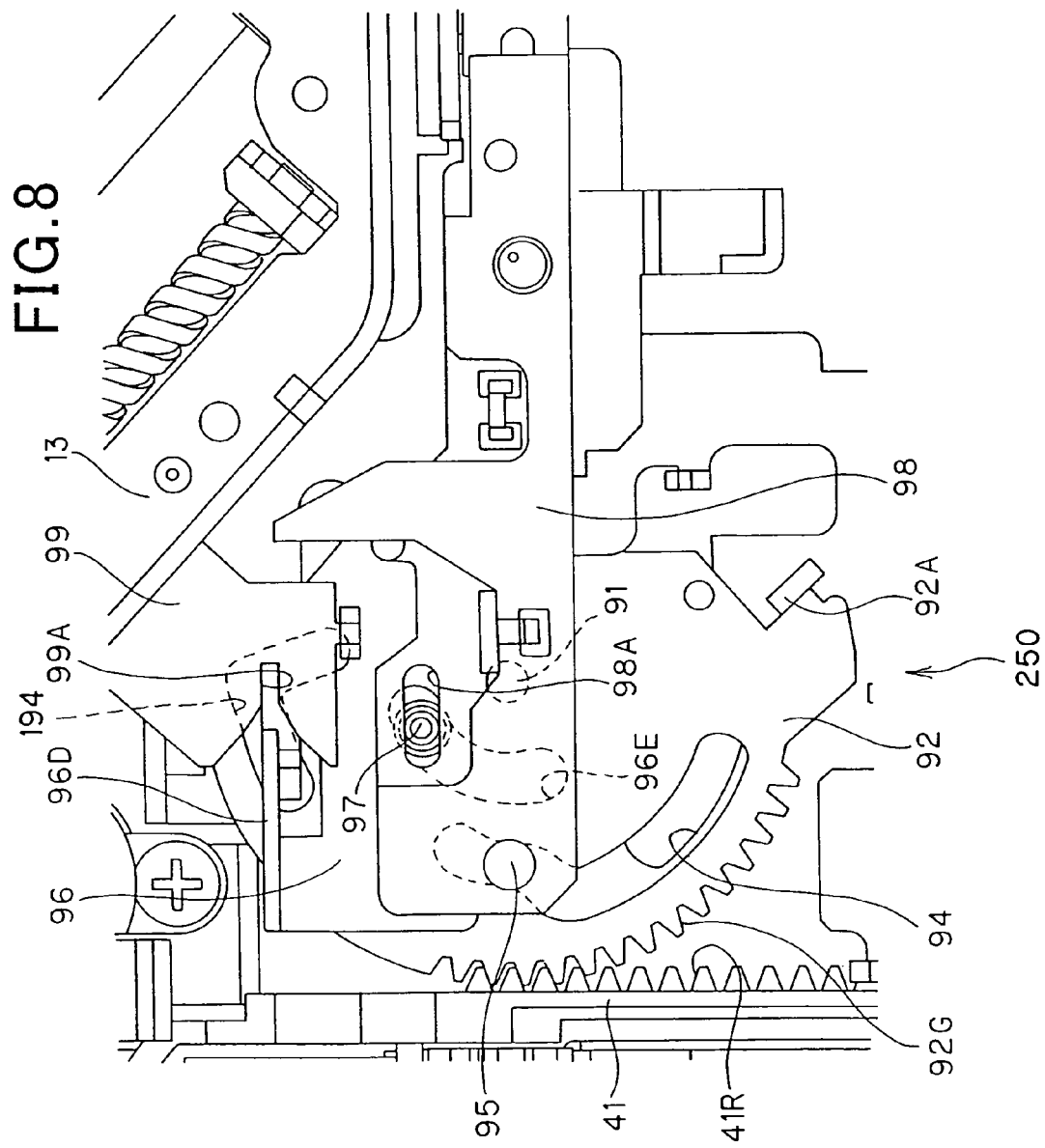
[FIG. 8] is a plan view showing an unlock state of the first lock mechanism.
Figure 9:
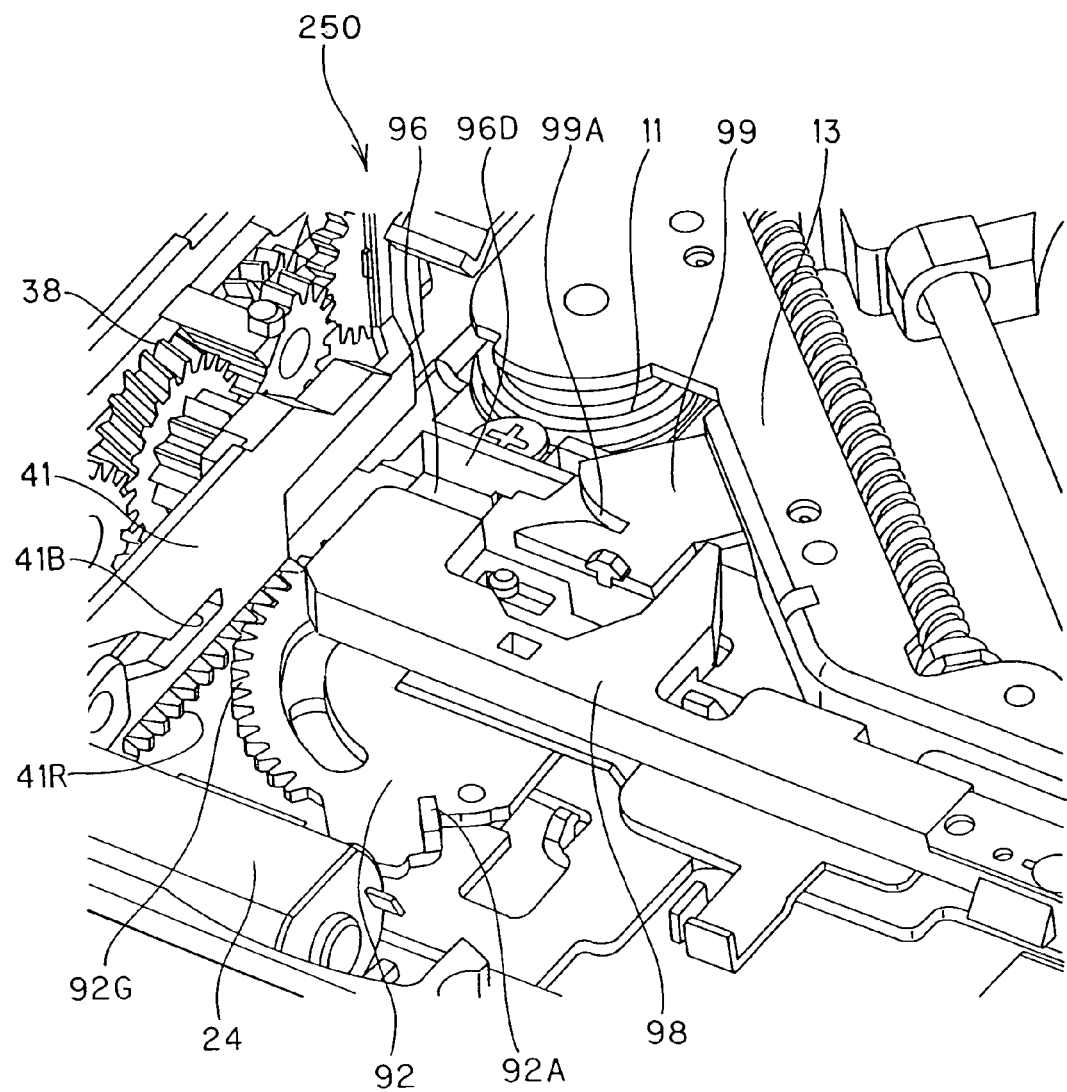
[FIG. 9] is a perspective view showing the unlock state of the first lock mechanism.
Figure 10:
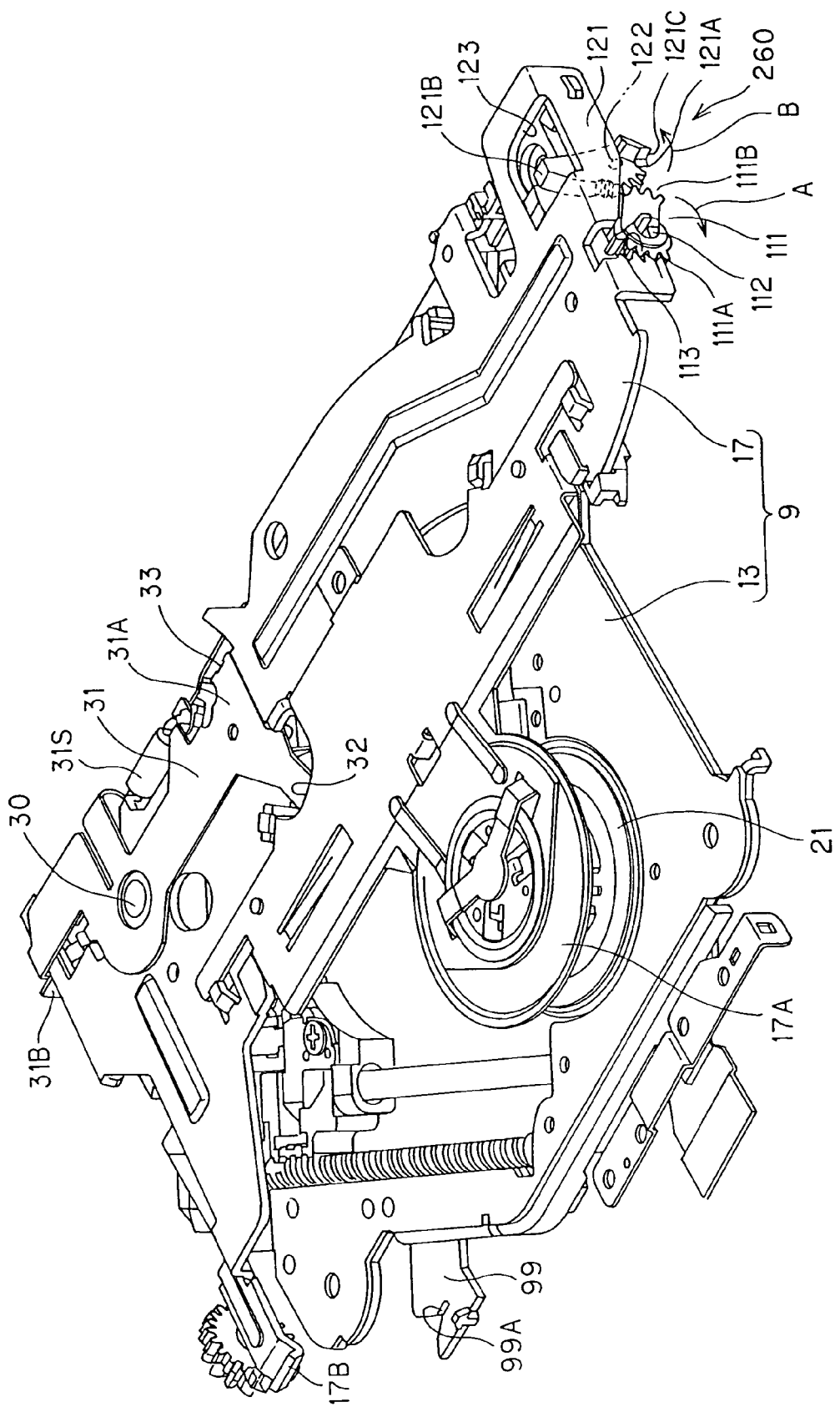
[FIG. 10] is a perspective view showing the lock state of a second lock mechanism.
Figure 11:
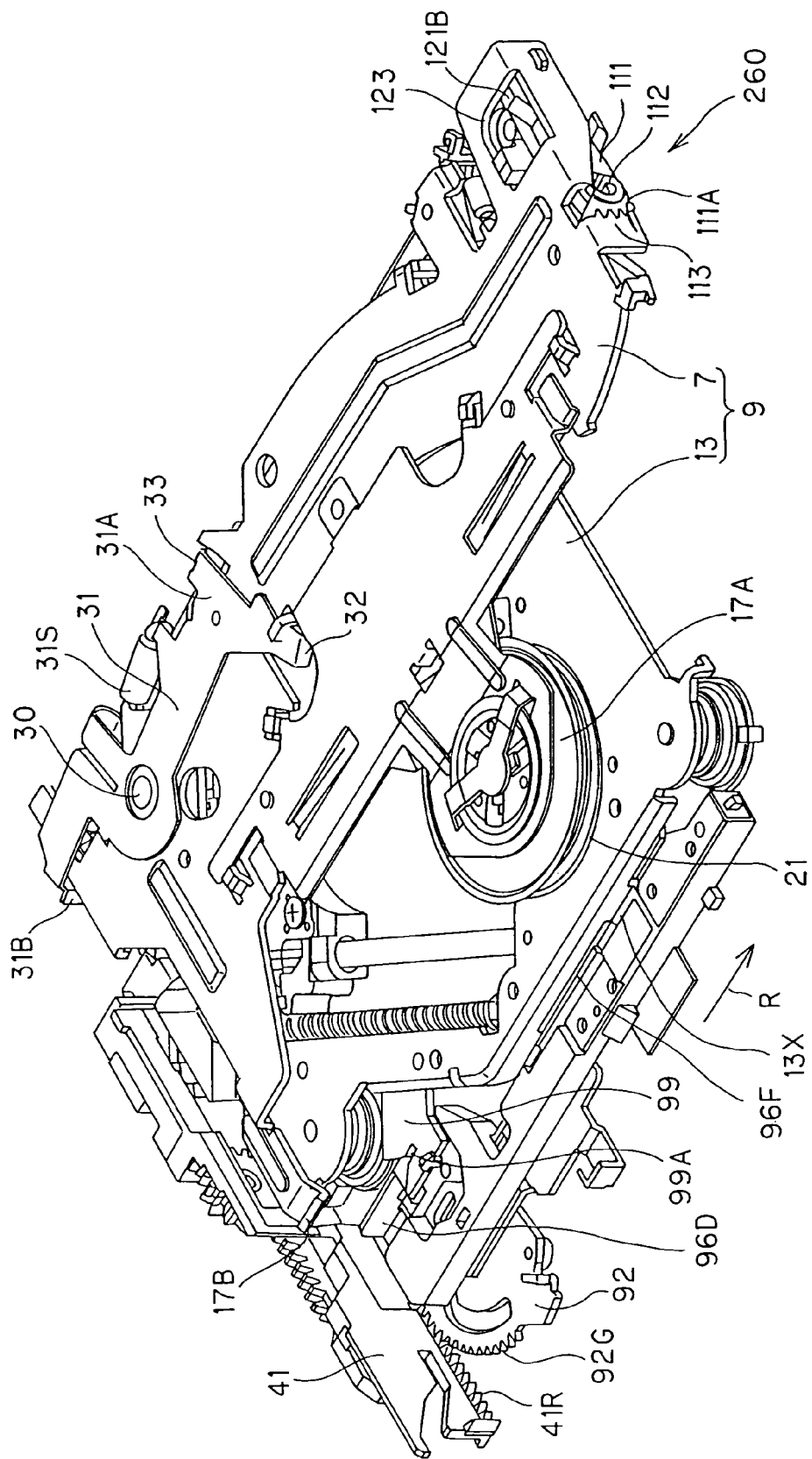
[FIG. 11] is a perspective view showing an unlock state of the second lock mechanism.

This lock mechanism comprises two mechanisms of a first lock mechanism and a second lock mechanism. FIGS. 6 and 7 show the lock state of the first lock mechanism, and FIGS. 8 and 9 shows the unlock state of the first lock mechanism. FIG. 10 shows the lock state of the second lock mechanism, and FIG. 11 shows the unlock state of the second lock mechanism.

A shown in FIG. 6, the first lock mechanism 250 is constructed by supporting a gear plate 92 on the bottom plate of the lower chassis 5 through a pin 91. One end of a spring 93 is joined to the fixed end 92A of the gear plate 92, and the other end of the spring 93 is joined to the fixed portion 5K of the lower chassis 5. Two different cam holes 94, 194 are formed in the lower chassis 5 and the gear plate 92, and a pin 95 of a sub lock plate 98 is fitted in the cam hole 94 of the gear plate 92. A pin 197 of a lock plate 96 is fitted in the cam hole 194. The gear plate 92 is supported so as to be freely rotatable around the pin 91, and also urged in a counterclockwise direction by a spring 93 at all times.

A gear 92G is integrally formed on the outer periphery of the gear plate 92, and the gear 92G is engaged with a rack gear 41R which extends in the forward and backward direction of the drive unit 9 and is formed on the inner surface of the bottom portion of the trigger cam 41 described above.

The lock plate 96 reciprocates in the right-and-left direction (the direction of an arrow Q) interlockingly with the swing operation of the gear plate 92. The lock plate 96 has a left end 96A, a lower end 96B and an upper end 96C in FIG.

6, and as shown in FIG. 7, it is equipped with lock pieces 96D, 96F which are bent and upwardly clinched and erected and an arcuate hole 96E.

The lock piece 96D freely intrudes into a groove 99A of a fixed piece, and the fixed piece 99 is fixed to a base plate 13 (see FIG. 10) of the drive unit 9. The lock piece 96F freely intrudes into a fixed piece 13X (see FIG. 11), and the fixed piece 13F is formed integrally with the base plate 13.

A pin 97 is loosely fitted in the arcuate hole 96E. The pin 97 is fixed to the gear plate 92 so as to extend upwardly and the upper end thereof is loosely fitted in an elongated hole 98A of the sub lock plate 98. The sub lock plate 98 extends in the same direction as the lock plate 96 above the lock plate 96. A pin 197 of the lock plate 96 is fitted in the cam hole 194 of the gear plate 92, and the pin 95 of the sub lock plate 98 is fitted in the cam hole 94. In connection with the swing motion of the gear plate 92, the lock plate 96 and the sub lock plate 98 reciprocates in the direction of the arrow Q in FIG. 6. In FIG. 11, when the lock plate 96 and the sub lock plate 98 moves in the direction of an arrow R, the lock piece 96D is fitted into the groove 99A of the fixed piece 99, and the lock piece 96F is fitted in the fixed piece 13X, whereby the drive unit 9 is set to the lock state. When the lock plate 96 and the sub lock plate 98 moves in the opposite direction to the arrow R, the lock piece 96D is separated from the groove 99A of the fixed piece 99, and the lock piece 96F is separated from the fixed piece 13X, whereby the drive unit 9 is unlocked.

Referring to FIG. 3, a through hole 35M is formed at the lower portion of the trigger 35, a fork pawl 211 is fitted in the through hole 35M, and the fork pawl 211 is formed integrally with the base plate 13 as not shown. Accordingly, when the trigger 35 moves forwardly, the fork pawl 211 is separated from the through hole 35M. When the trigger 35 backs away to a retract limit position, the fork pawl 211 is fitted in the through hole 35M, and thus the drive unit 9 is set to the lock state. In this embodiment, when the drive unit 9 is set to the lock state, the fork pawl 211 is fitted in the through hole 35M, the lock piece 96D is fitted into the groove 99A of the fixed piece 99 and the lock piece 96F is fitted to the fixed piece 13X, whereby the drive unit is locked at three points.

As shown in FIG. 10, the second lock mechanism 260 is located at the opposite side to the first lock mechanism 250, and disposed in the drive unit 9.

That is, the second lock mechanism 260 comprises a cam member 111 and a lock member 121. The cam member 111 is freely rotatably mounted on the base plate 13 of the drive unit 9 by a pin 112, and gears 111A and 111B are integrally formed at the base end and free end of the cam member 111, respectively. The gear 111A at the base end is engaged with a gear 113 formed on the swing plate 17 of the drive unit 9, and the gear 111B at the free end is engaged with a gear 121A of the lock member 121.

The lock member 121 is freely rotatably mounted on the base plate 13 by a pin 122, and the free end 121B thereof is projected from an opening 123 formed in the swing plate 17 of the drive unit 9.

Under this state, the free end 121B projecting upwardly from the opening 123 abuts against the back surface of the upper chassis 7 (not shown), and the base end 121C extending to the back side of the free end 121B abuts against the lower chassis 5 (not shown), whereby the drive unit 9 is locked to the upper chassis 7 and the lower chassis 5. Furthermore, when the free end 121B and the base end 121C are set to a turn-down state (FIG. 11), the lock is released.

The lock operation or unlock operation of the lock mechanism is carried out interlockingly with the operation of the trigger 35 and the trigger cam 41.

The first lock mechanism 250 and the second lock mechanism 260 are locked with a time lag, and unlocked with a time lag. When the lock is released, in the first lock mechanism 250, the lock piece 96D is not fitted in the groove 99A of the fixed piece as shown in FIGS. 8 and 9. In the second lock mechanism 260, the free end 121B of the lock member 121 is turned down and it is not projected from the opening 123 of the swing plate 17 as shown in FIG. 11. In this case, the trigger 35 and the trigger cam 41 are located at the forward-movement limit position. Accordingly, as described above, since the swing plate 17 of the drive unit 9 pinches the disc, it is closed by a magnet and a spring force, the drive unit 9 is supported through the three antivibration structures 11 while floated, and thus the disc can be reproduced while rotated.

When the disc player enters a disc eject operation to reversely rotate the motor 24 and the trigger 35 and the trigger cam 41 moves backwardly (in the direction of the arrow Y), the gear plate 92 having the gear 92G engaged with the rack gear 41R is swung in the clockwise direction around the pin 91, and in connection with this clockwise swing motion, the lock plate 96 gradually moves to the right side in FIG. 8. When the trigger 35 and the trigger cam 41 reaches the backward-movement limit position, the lock piece 96D of the lock plate 96 is fitted into the groove 99A of the fixed piece 99 as shown in FIG. 6, and also the lock piece 96F is fitted to the fixed piece 13X. Further, the fork pawl 211 is fitted in the through hole 35M, the first lock mechanism 250 functions, and the drive unit 9 is locked to the upper chassis 7 and the lower chassis 5.

Furthermore, when the trigger cam 41 is backwardly moved, the tip 17A of the swing plate 17 is gradually opened from the state of FIG. 11 to the state of FIG. 10. In this opening process, as shown in FIG. 10, the cam member 111 is engaged with the gear 113 of the swing plate 17 and swung in the direction of the arrow A. Interlocking with this swing motion, the lock member 121 is swung in the direction of the arrow B through the gear 111B and the gear 121A, and the free end 121B thereof is projected from the opening 123 of the swing plate 17. The projected free end 121B abuts against the back surface of the upper chassis (not shown), the base end 121C abuts against the lower chassis 5 (not shown), the second lock mechanism 260 functions, and the drive unit 9 is locked to the upper chassis 7 and the lower chassis 5.

In this construction, the trigger cam 41 is allowed to reciprocate in the forward and backward direction of the drive unit 9, and the lock plate 96 interlocked with the reciprocating operation of the trigger cam 41 is allowed to reciprocate in the right-and-left direction of the drive unit 9. Therefore, even when force acts on the lock piece 96D so as to separate the lock piece 96D from the groove 99A of the fixed piece 99, the acting direction of this force is perpendicular to the operating direction of the trigger cam 41 and thus this force does not contribute to the reciprocating operation of the trigger cam 41.

Accordingly, even when unintentional force acts on the lock piece 96 so as to make the lock piece 96D escape from the groove 99A of the fixed piece 99, the lock is not released, and the lock state of the drive unit 9 is sufficiently self-held.

Furthermore, the driving mechanism comprising the trigger 35, the trigger cam 41, the gear train 38, etc. is disposed at one side of the drive unit 9, and the first lock mechanism 250 is disposed at the same side. Therefore, as compared with a case where they are disposed at both the sides, the space can be saved, and the disc player can be miniaturized.

As described above, even when the first lock mechanism 250 is disposed at one side, the different second lock mechanism 260 is disposed at the opposite side of the drive unit 9.

Therefore, the lock state is equivalent to a so-called both-side lock state by a simple construction, and the best lock state can be obtained. Furthermore, the lock member 121 of the second lock mechanism 260 rises and falls interlockingly with the opening/closing operation of the swing plate 17. Therefore, an extra actuator for making the lock member 121 rises and falls is unnecessary, and thus the second lock mechanism 260 can be operated with a simple construction.

Figure 12:
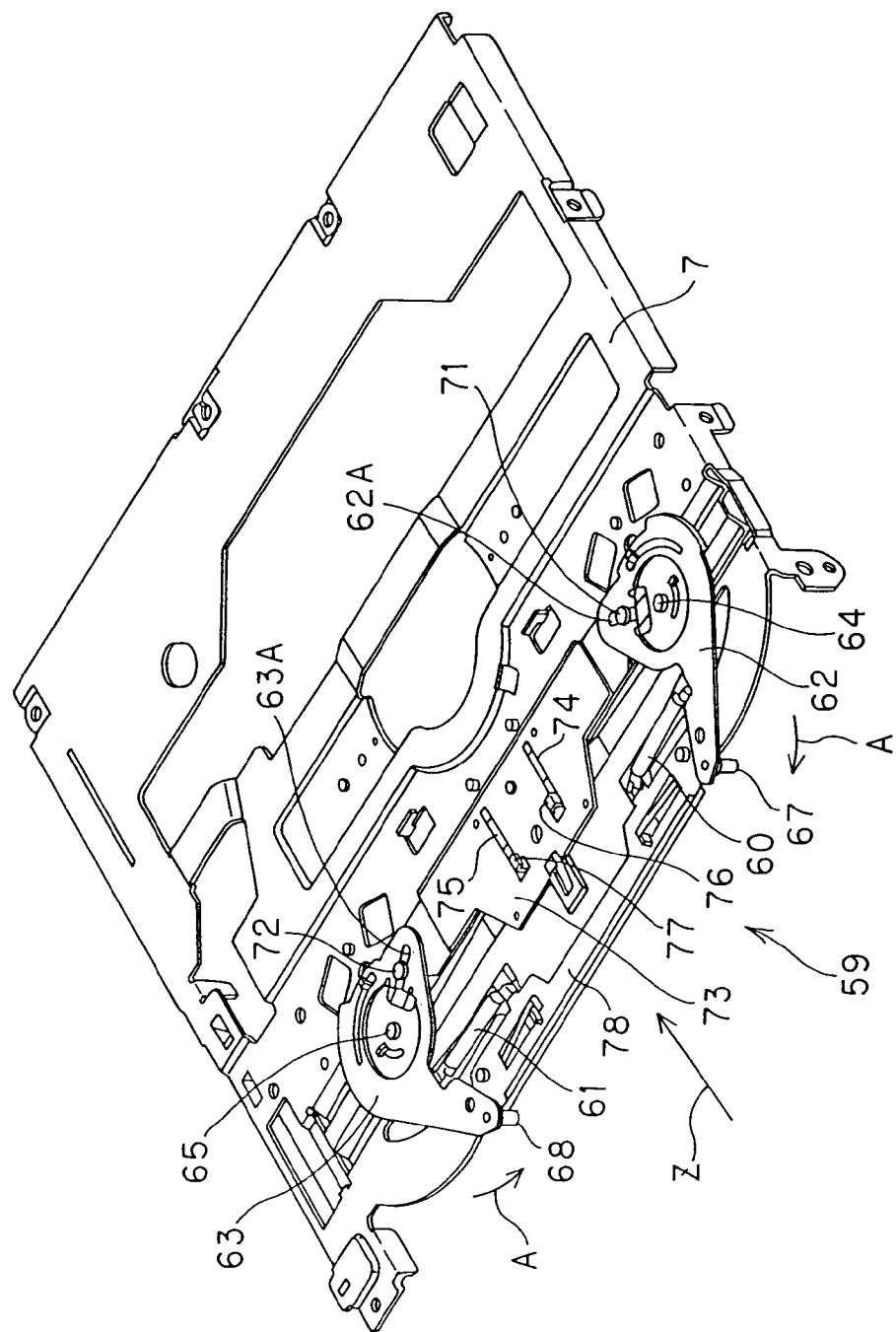
[FIG. 12] is a perspective view showing a pair of gate members.

In this construction, as shown in FIG. 1, the pair of gate members 59 which come into contact with the outer peripheral portion of the inserted disc and evacuated to the side of the insertion port 23 are provided at the insertion port 23 of the disc. The gate members 59 are provided with the pair of turn plates 62, 63 which are disposed so as to be divided to both the sides with respect to the center of the insertion port 23, and as shown in FIG. 12, these turn plates 62, 63 are joined to the outer surfaces of the front portion of the upper chassis 7 through pins (support members) 64, 65. The turn plates 62, 63 are urged in the closing direction (the direction of the arrow A) by springs 60, 61, and a pair of gate pins 67, 68 which face the insertion port 23 are secured to the turn plates 62, 63.

Slide holes 62A, 63A are formed at the base portions of the turn plates 62, 63, and pins 71, 72 which are fitted in these slide holes 62A, 63A are secured to a joint plate 73. The base portions of the turn plates 62, 63 are joined to each other through the joint plate 73. A pair of guide holes 74, 75 extending in the insertion direction (the direction of the arrow Z) of the disc are formed in the joint plate 73, and guide portions 76, 77 fitted in the guide holes 74, 75 are formed by cutting and upwardly erecting a part of the upper chassis 7 and then bending the part horizontally. These erected slender portions are fitted in the guide holes 74, 75. 78 represents a plate secured to the upper chassis 7, and the plate 78 functions as a stopper in the closing direction of the turn plates 62, 63.

Figure 13:
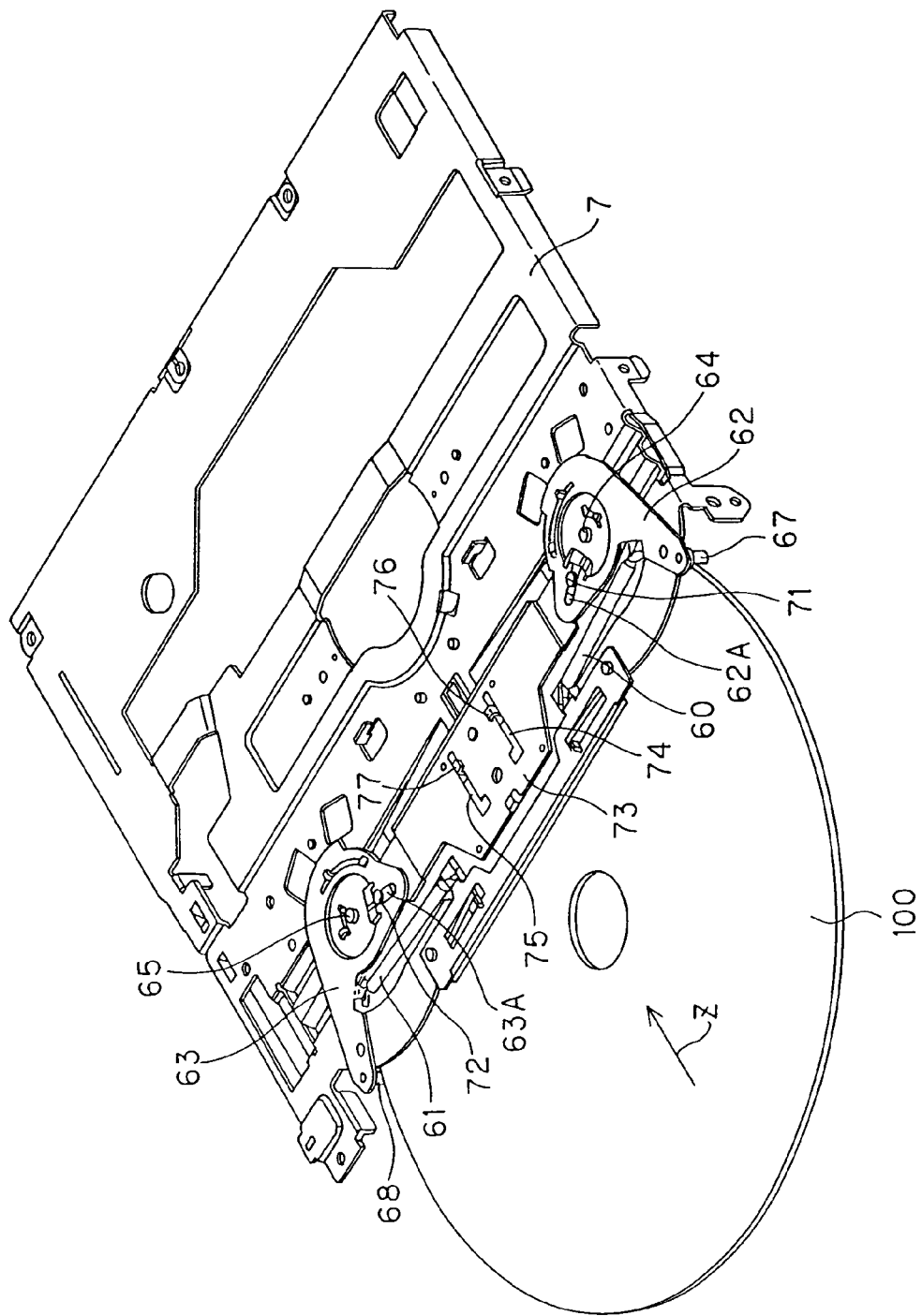
[FIG. 13] is a perspective view showing a state under which the gate members are opened by a 12 cm disc.

When the disc is inserted into the insertion port 23, the disc pushes out the gate pins 67, 68 to the sides. For example, when a large disc 100 of 12 cm in diameter is inserted, the outer peripheral portion 100A of the disc 100 pushes out the pair of gate pins 67, 68 to the sides of the insertion port 23 as shown in FIG. 13, and the turn plates 62, 63 are swung in the opening direction (the direction of the arrow B). In connection with this swing motion, the pins 71, 72 move in the slide holes 62A, 63A, whereby the joint plate 73 reciprocates in the disc insertion direction (the direction of an arrow Z) along the guide portions 76, 77 interlockingly with the swing motion of the turn plates 62, 63.

Figure 14:
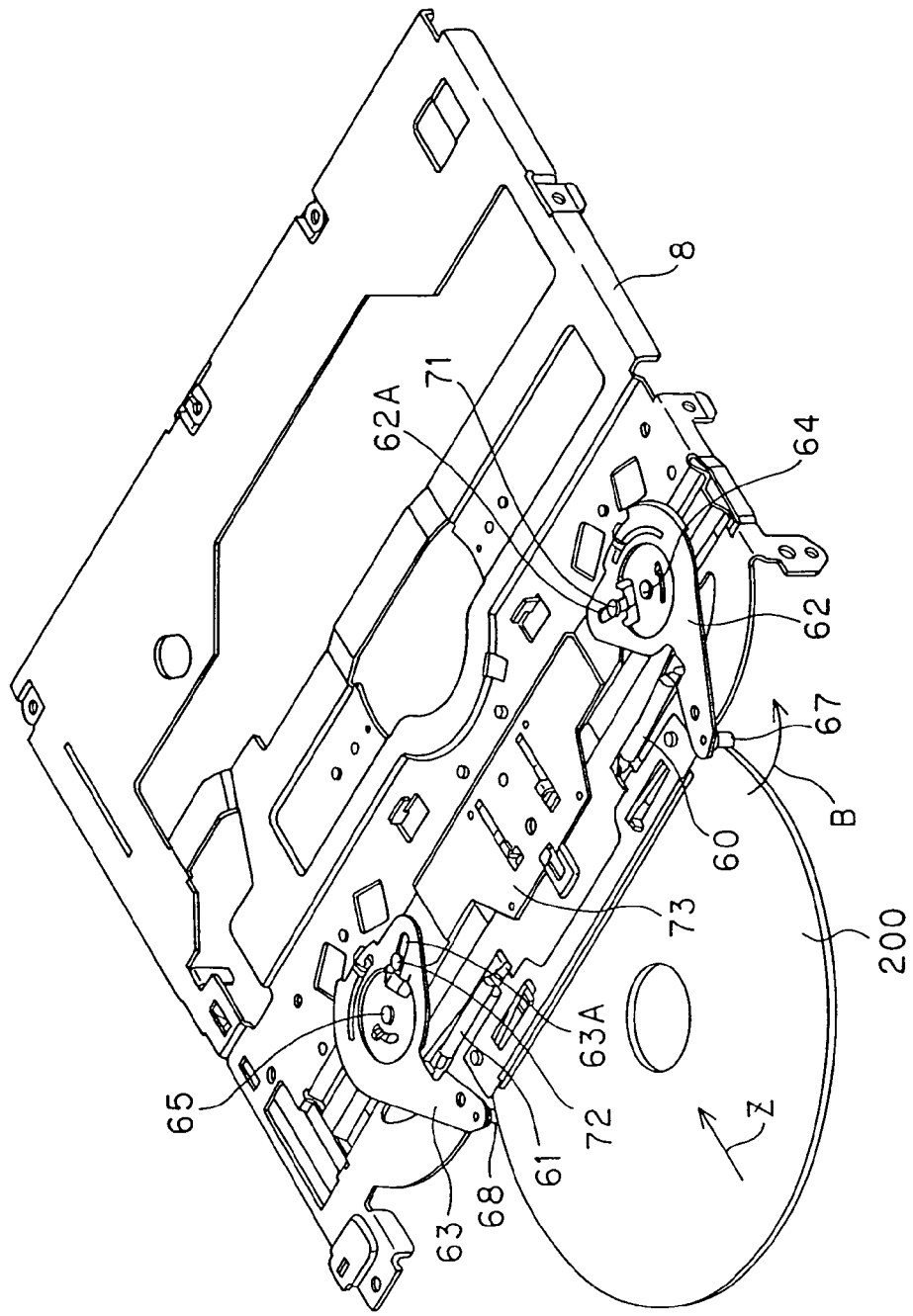
[FIG. 14] is a perspective view showing a state under which the gate members are opened by an 8 cm disc.

FIG. 14 is a perspective view when a small disc 200 of 8 cm in diameter is inserted. In this case, the disc diameter is smaller than the width of the insertion port 23, and thus there is a risk that the disc is inserted while displaced to one end of the insertion port 23. For example, when the disc 200 is inserted while displaced to the side of one gate pin 67, the other gate pin 68 is hardly pushed out, and only one pin 67 is pushed out. In this case, only the turn plate 62 at the side of one gate pin 67 is swung in the opening direction (the direction of the arrow B).

In this construction, the other turn plate 63 is not opened. When only one turn plate 62 is opened, the joint plate 73 is not turned at the pin 72 side, and it is turned at only the pin 71 side. In this case, the joint plate 73 is inclined.

When the joint plate 73 is inclined, the guide portions 76, 77 are not correctly fit to the slide holes 62A, 63A, and thus these guide portions 76, 77 abut against the hole walls of the guide holes 74, 75, so that the joint plate is not further moved in the insertion direction of the disc 200 (the direction of the arrow Z). Accordingly, the further swing motion of the turn plates 62, 63 is prevented, and thus the disc insertion is obstructed.

This sate is also applied to the case where the disc 200 is inserted while displaced to the side of the other gate pin 68. The guide holes 74, 75 and the guide portions 76, 77 fitted in the respective holes 74, 75 constitute lock means.

That is, in this construction, when the disc 200 is inserted while displaced to the end of the insertion port 23, the guide portion 76,77 get stuck with the hole walls of the guide holes 74, 75 and serve as resistance, so that the joint plate 73 is locked. Accordingly, the disc which is displaced to the end of the insertion port 23 is prohibited from being inserted. Accordingly, a mechanism for guiding to the center inside the main body a disc which is pulled in while displaced to one side is unnecessary, and thus the apparatus can be miniaturized and particularly the dimension in the thickness direction of the apparatus can be reduced.

FIG. 15 is a perspective view when the upper chassis 7 is viewed from the back side. Guide bars (guide mechanism) 81, 82 extending on two lines are provided to the inner surface of the upper chassis 7 so as to project to the lower side (to the side facing the loading roller 25) when the upper chassis 7 is assembled and downwardly (upwardly) guides a disc inserted into the insertion port 23.

These guide bars 81, 82 extend in parallel to each other in the side direction of the insertion port 23, and each of the guide bars 81, 82 is gradually increased in height to the end of the insertion port 23. The front-side guide bar 81 is designed so that the height of the projection portion 81A thereof is gradually increased in height from a position nm near to the center, and the back-side guide bar 82 is designed so that the height of the projection portion 82A thereof is gradually increased from a position n which is more displaced to the end than the position m. The loading roller 25 confronts the pair of guide bars 81, 82, and the disc is loaded while pinched by the roller 25 and the guide bars 81, 82.

Figure 16:
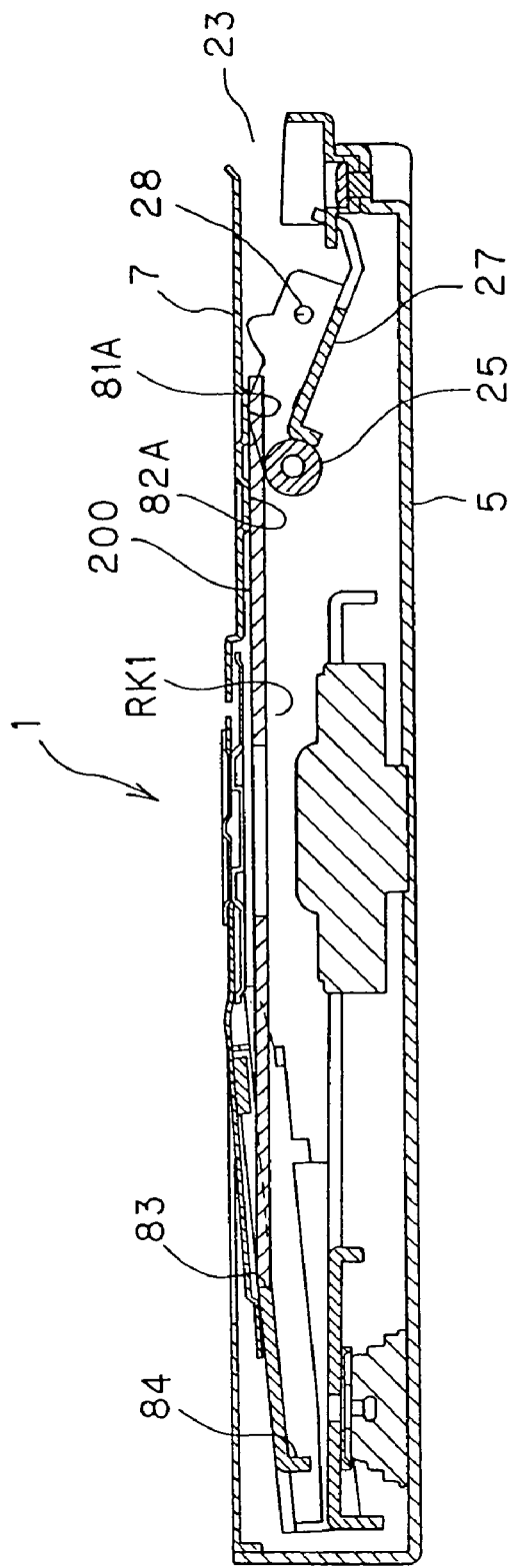
[FIG. 16] is a cross-sectional view when the 8 cm disc is inserted.
Figure 17:
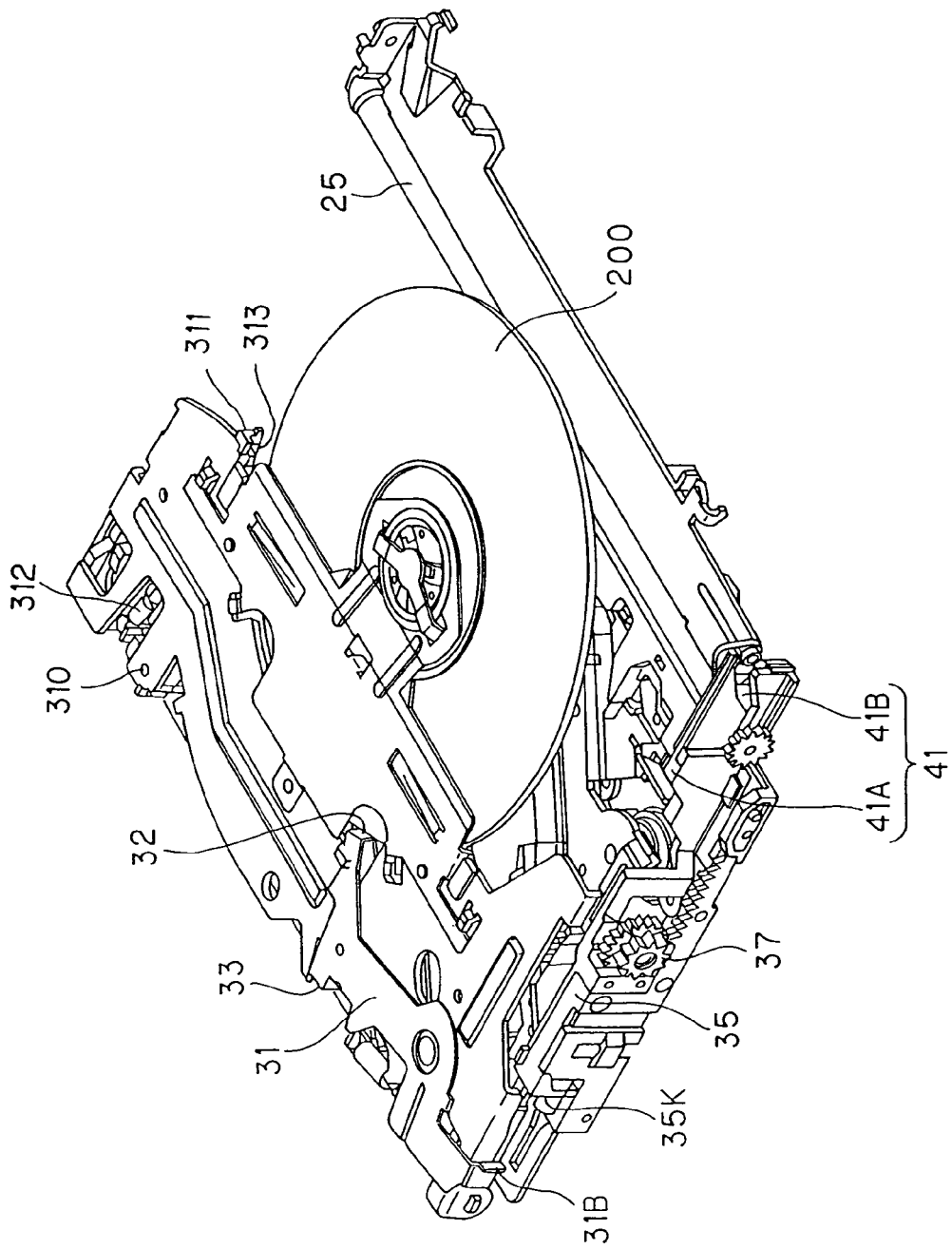
[FIG. 17] is a perspective view of FIG. 16.
Figure 18:
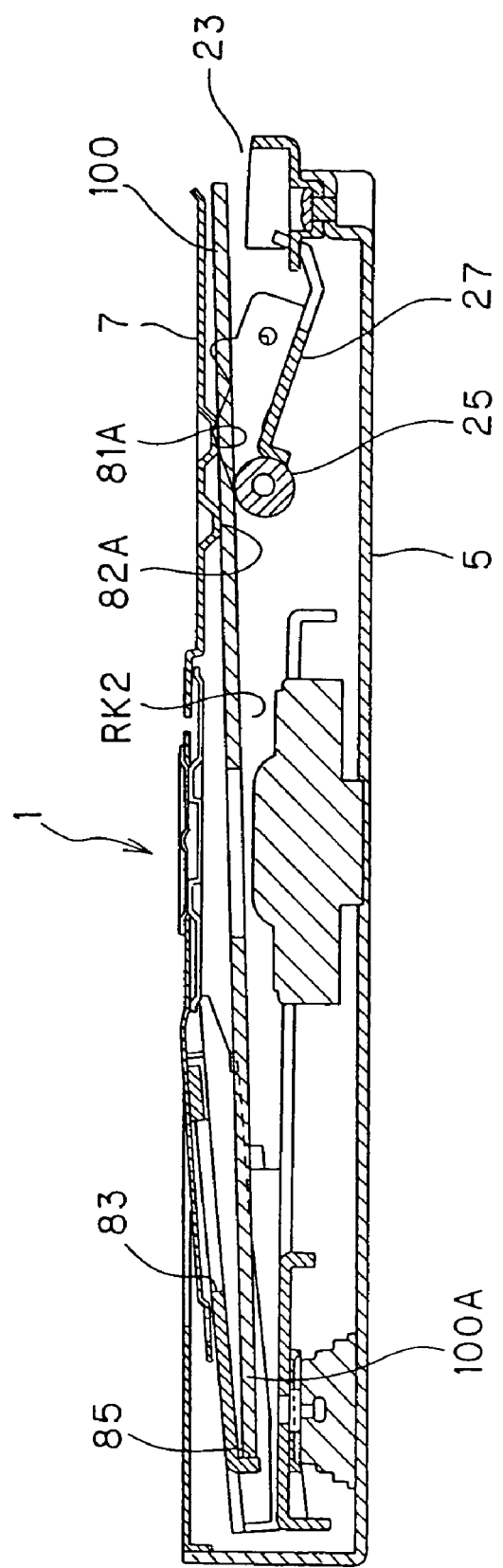
[FIG. 18] is a cross-sectional view when the 12 cm disc is inserted.
Figure 19:
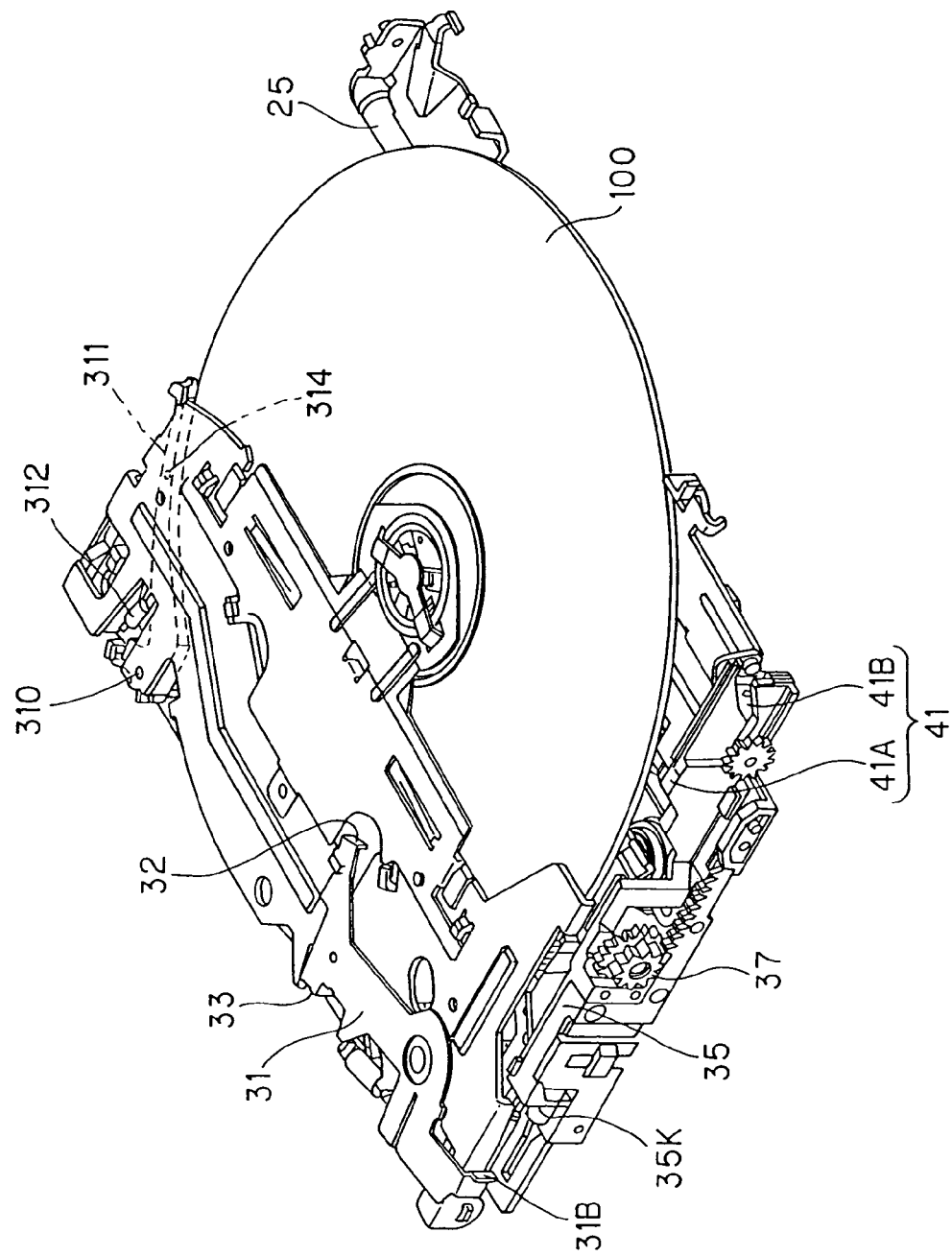
[FIG. 19] is a perspective view of FIG. 18.

FIG. 16 is a cross-sectional view when the disc 200 of 8 cm in diameter is inserted, FIG. 17 is a perspective view of FIG. 16, FIG. 18 is a cross-sectional view when the disc 100 of 12 cm in diameter is inserted, and FIG. 19 is a perspective view of FIG. 18.

As shown in FIG. 16, when the disc 200 of 8 cm in diameter is inserted, the disc 200 inserted from the insertion port 23 is pinched between the loading roller 25 and the lower projecting portions 81A, 82A of the guide bars 81, 82, and loaded to the back side of the main body 1 along a first loading passage RK located at a high place in the main body 1. A first disc contact portion 83 is located at the terminal portion of the first loading passage RK1, and the disc 200 is brought into contact with the first disc contact portion 83 and stopped. In this stage, the disc 200 pushes and moves the pawl portion 32 of the trigger plate 31 as shown in FIG. 17, and the clamp operation of the disc 200 is executed as described above with this push and movement as a trigger.

As shown in 18, when the disc 100 of 12 cm in diameter is inserted, the disc 100 inserted from the insertion port 23 is pinched between the loading roller 25 and the higher projecting portions 81A, 82A of the guide bars 81, 82, and loaded to the back side of the main body 1 along a second loading passage RK2 located at a low place in the main body 1. As shown in FIG. 19, a guide bar 331 is formed so as to come into contact with the outer periphery (the right back side of FIG. 13) of the disc 100 of 12 cm in diameter. The guide bar 331 is mounted so as to be swingable around a pin 310, and is urged clockwise around the pin 310 through a spring 312. As shown in FIG. 17, a backwardly-declined tapered face 313 is formed on the lower surface of the free end of the guide bar 331. When the disc 100 of 12 cm in diameter is inserted, the tip 100A of the disc 100 is oriented to the lower side along the tapered face 313, and crosses the pawl portion 32 of the trigger plate 31. When the disc 100 further progresses to the back side, the guide bar 331 is counterclockwise turned around the pin 310, and stable loading is executed while the outer periphery of the disc 100 is guided by the guide bar 331. A second disc contact portion 84 is located at the terminal portion of a second loading passage RK2. The disc 100 comes into contact with the second disc contact portion 84 and stops there. In this stage, the disc 100 pushes and moves the pawl portion 33 of the trigger plate 31 as shown in FIG. 19, and the clamp operation of the disc 100 is executed as described above with this push and movement as a trigger. When the clamping is completed, the projection 314 of the lower surface of the guide bar 331 is fitted into a recess (not shown) of the swing plate 17 side, and the guide bar 331 is separated from the outer periphery of the disc 100, and fixed. Accordingly, the guide bar 331 is prevented from coming into contact with the disc 100 at the play time.

In this construction, the different loading passages RK1 and RK2 are separately formed at the upper and lower sides in the main body 1. Therefore, it is unnecessary that a complicated mechanism for holding discs different in size is provided at the terminal portion of the loading passage as in the case of the prior art, and thus the apparatus can be designed to be thin. Furthermore, this construction may be applied to a disc player for loading discs different in material or the like. In this case, if the loading passage is improved in accordance with the material or the like, a disc player in which discs are not scratched can be provided.

In general, a disc player for reproducing information of a recording medium disc such as CD (compact disc), DVD (digital versatile disc) or the like is equipped with a drive unit for chucking a disc on a turn table and rotating the turn table under this state to thereby rotate the disc, and a pickup driving mechanism for sliding a pickup for reading information from the rotated disc in the radial direction of the disc.

As this type of pickup driving mechanism has been proposed a mechanism which is equipped with a lead screw having a spirally formed groove, a projection which is secured to a pickup and fitted in the groove of the lead screw, and a rack member (support member) having elasticity for pushing the projection to the groove of the lead screw and in which the fitting state between the groove of the lead screw and the rack member is kept excellent as described in JP-A-2003-36615.

However, the conventional construction has a problem that a part of the rack member is deformed (creep-deformation) by the urging force of an elastic member or the part is broken. Therefore, there has been also desired a mechanism in which the fitting state between the groove of the lead screw and the projection of the rack member is kept excellent and the creep deformation of the rack member by the urging force of the elastic member is prevented.

Figure 20:
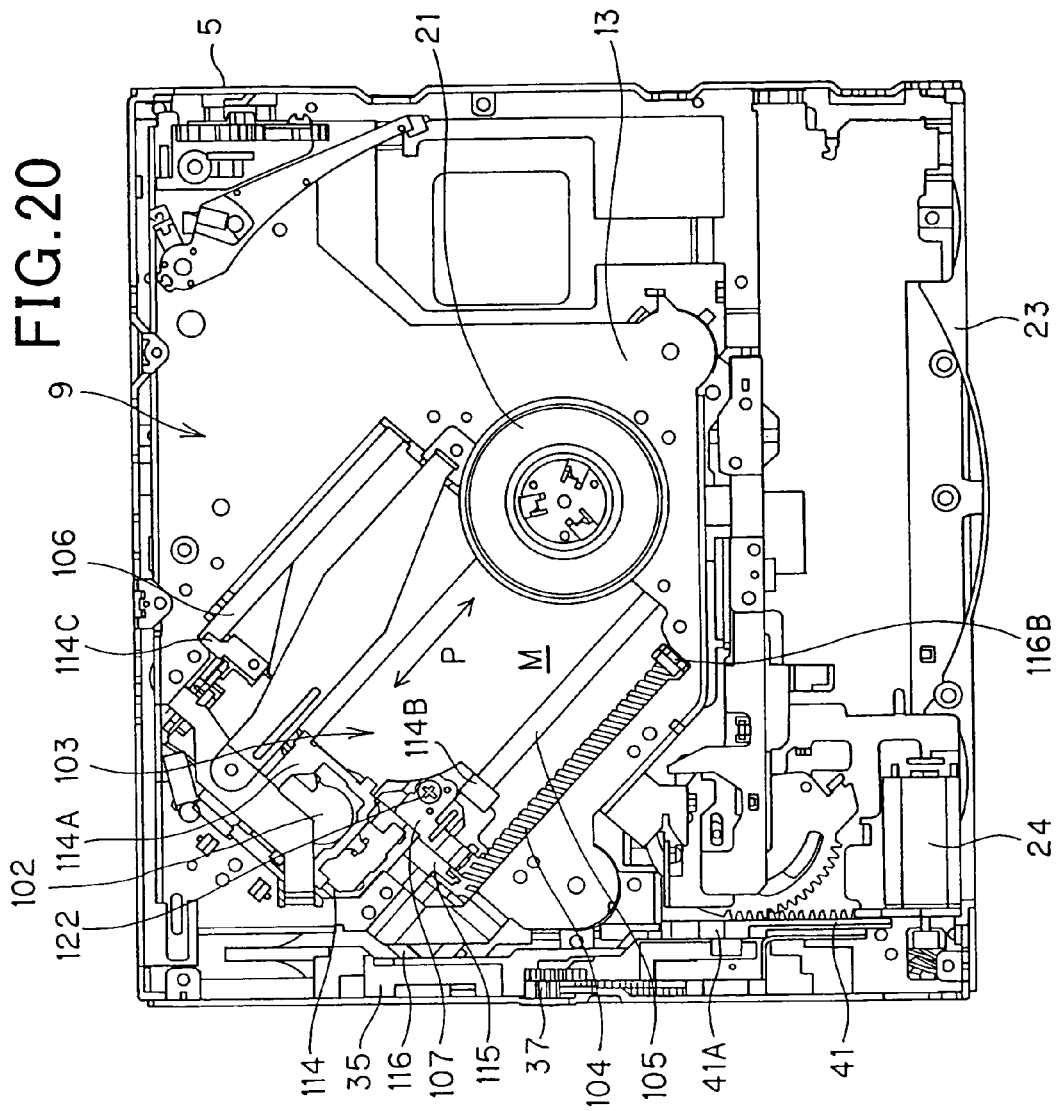
[FIG. 20] is a plan view when the drive unit is secured to the lower chassis.

Therefore, in this construction, an opening portion M is formed in the base plate 13 of the drive unit 9 as shown in FIG. 20, and a pickup driving portion (support member driving mechanism, pickup driving mechanism) 103 for driving a pickup 102 in the radial direction of the disc (in the direction of P in FIG. 20) is disposed in the opening portion M. The pickup driving portion 103 is equipped with a lead screw 104 provided along the radial direction of the disc, two guide shafts 105, 106 disposed substantially in parallel to the lead screw 104, and a pickup optical part support member 114 which is suspended between the guide shafts 105 and 106 and freely slidable along the axial direction of the guide shafts 105, 106 by the rotation of the lead screw 104.

Figure 21:
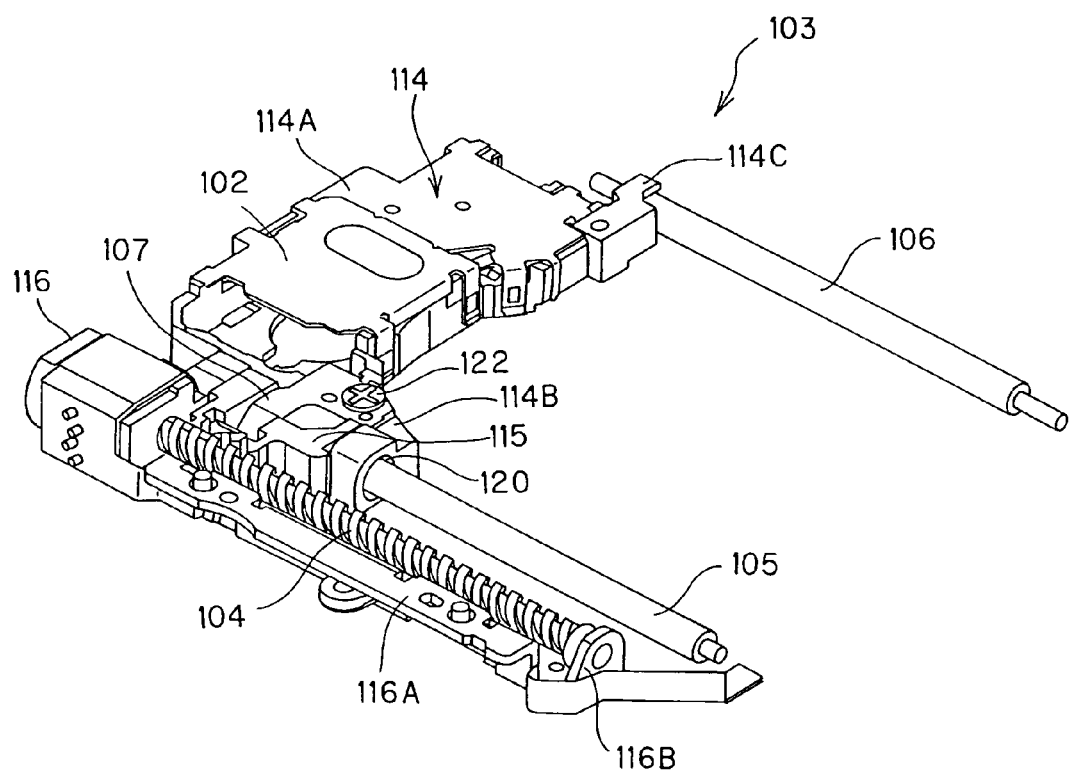
[FIG. 21] is a perspective view of a pickup driving unit.

A stepping motor 116 for rotating the lead screw 104 is directly joined to one end of the lead screw 104 as shown in FIG. 21, and the other end thereof is freely rotatably supported by a bearing portion 116B formed in the base frame 116A. Furthermore, the guide shafts 105, 106 are supported by bearing portions (not shown) formed at the lower surface side of the base plate 13.

The pickup optical part support member 114 is equipped with a base portion 114A on which the pickup 102 is mounted. A first bearing portion 114B having an insertion hole 120 in which the guide shaft 105 is inserted is provided to one end side of the base portion 114A, and a second bearing portion 114C having a substantially U-shaped section in which the guide shaft 106 is fitted is provided to the other end side of the base portion 114A.

In this embodiment, a rack member 115 and a leaf spring 107 for urging a gear portion 115B (described later) of the rack member 115 to the lead screw 104 are arranged at the first bearing portion 114B of the pickup optical part support member 114 while overlapped with each other, and the rack member 115 and the leaf spring 107 are fixed to the first bearing portion 114B by a screw 122.

Figure 22:
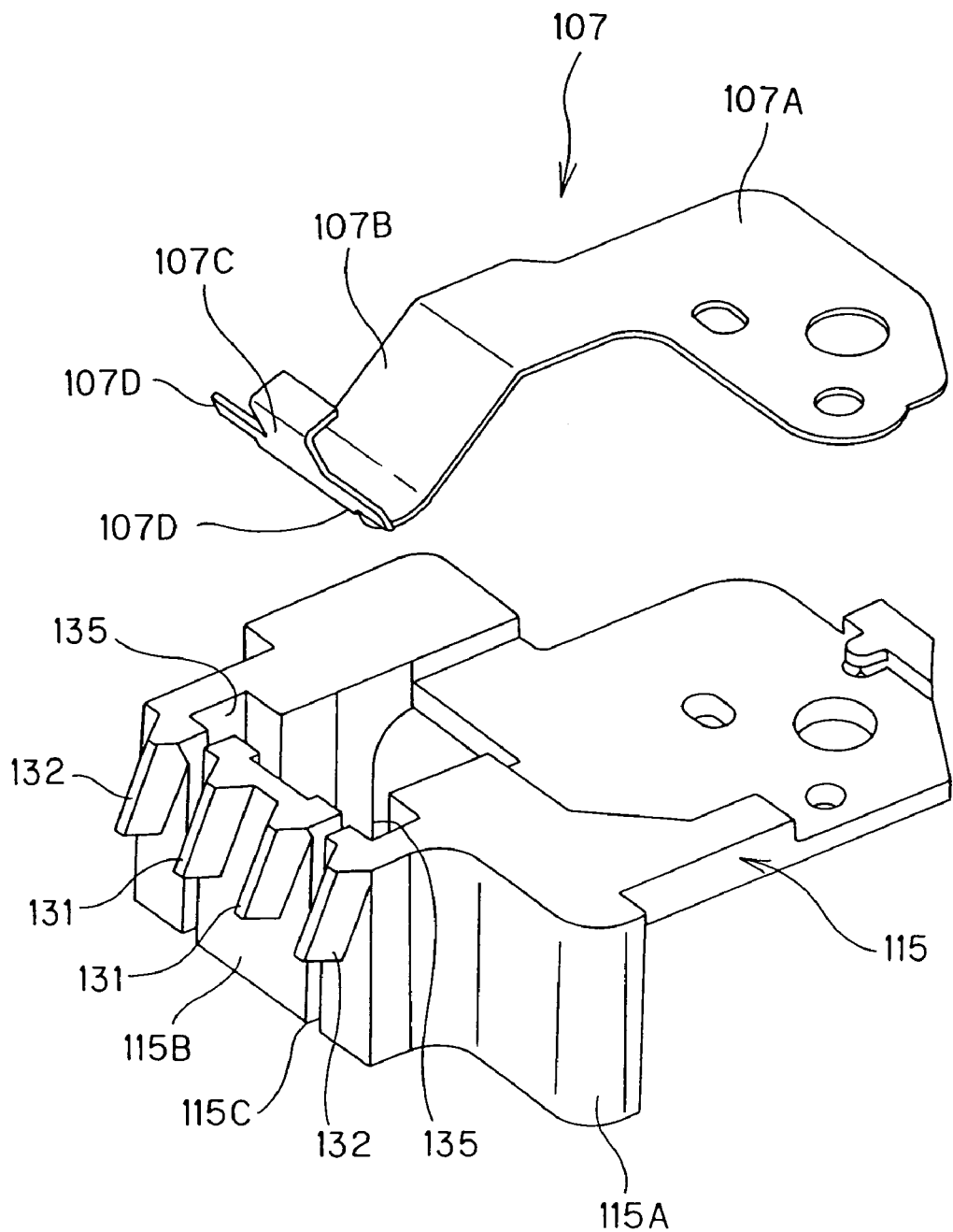
[FIG. 22] is an exploded perspective view of a rack member.

As shown in FIG. 22, the rack member 115 is equipped with a resin rack member main body (support member) 115A and a gear portion 115B disposed at the front surface side of the rack member main body 115A, and plural (two in this embodiment) first projections 131 which are engaged with the lead screw 104 are formed on the front surface of the gear portion 115B. Second projections 132 are formed on the front surface of the rack member main body 115A so as to be aligned with the projections 131.

Figure 23:
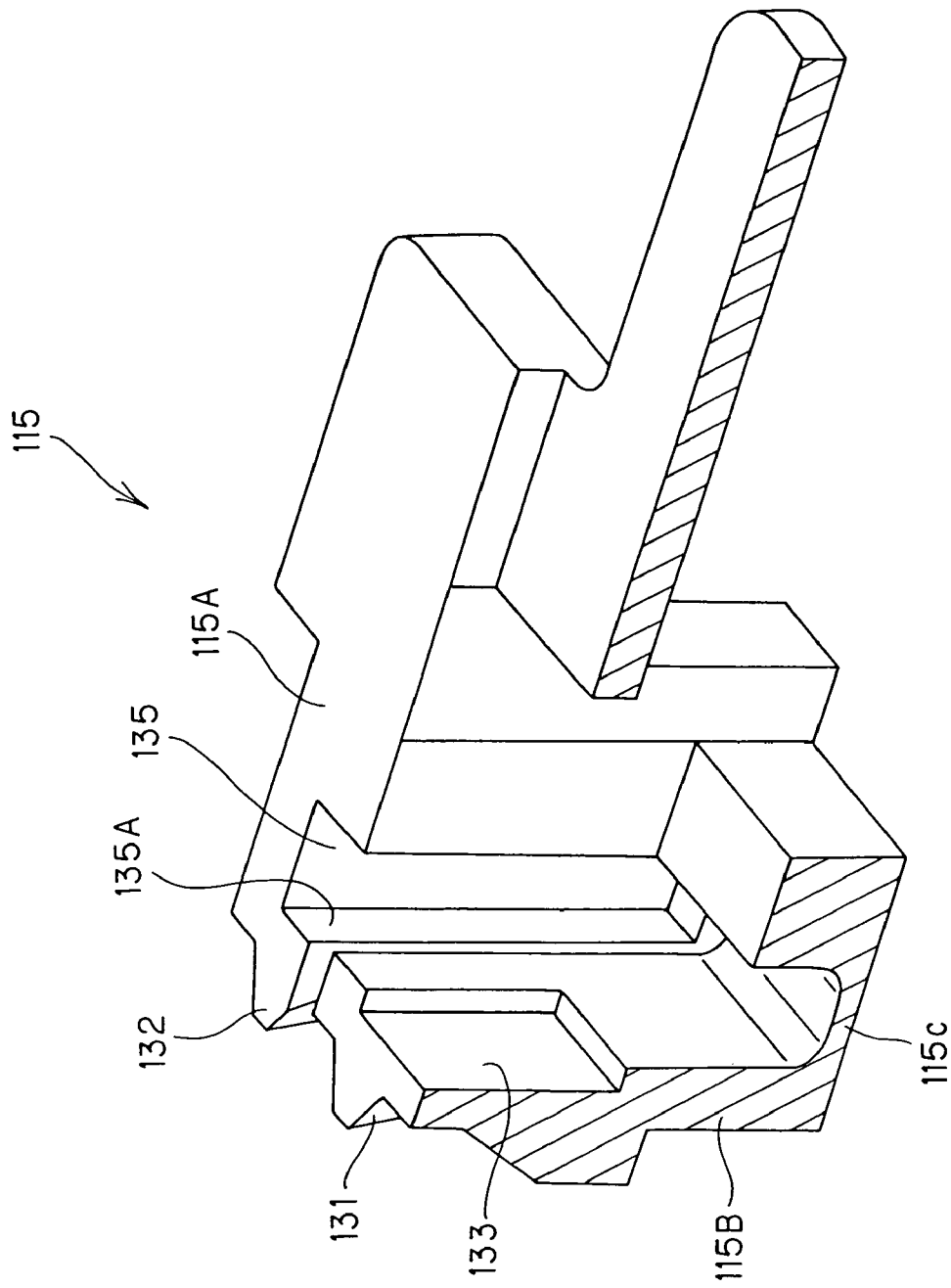
[FIG. 23] is a perspective view showing the cross-section of the rack member.

As shown in FIG. 23, the lower end of the gear portion 115B is joined to the rack member main body 115A through a thin portion 115C. That is, the rack member 115 is formed of resin so as to be integrally provided with the rack member main body 115A and the gear portion 115B, and the gear portion 115B is constructed to be freely tilted through the thin portion 115C. In this construction, the first projections 131 formed on the gear portion 115B function as movable teeth, and the second projections 132 formed on the rack member main body 115A function as fixed teeth.

As shown in FIG. 22, the leaf spring 107 is equipped with a flat plate portion 107A fixed to the rack member main body 115A, and a spring portion 107B which is provided continuously with the flat plate portion 107A and bent in a substantially L-shape in section. The tip portion of the spring portion 107B is provided with a contact portion 107C which is formed by bending the tip portion substantially vertically inwardly, and the contact portion 107C is fitted in a recess portion 133 (FIG. 23) formed on the back surface of the gear portion 115B.

The spring portion 107B is provided with regulating portions 107D which are fitted to the rack member main body 115A to regulate the tilt angle of the gear portion 115B when the gear portion 115B is tilted through the thin portion 115C by the urging force of the leaf spring 107. The regulating portions 107D extend from both the side ends of the contact portion 107C, and are formed to be larger than the width of the gear portion 115B.

As shown in FIG. 23, groove portions 135 in which the regulating portions 107D of the leaf spring 107 are mounted are formed in the rack member main body 115A, and when the gear portion 115B is tilted through the thin portion 115C, regulating portions 121D abut against the front surfaces 135A of the groove portions 135, thereby regulating the tilt angle of the gear portion 115B.

According to this embodiment, the drive unit 9 for rotating the disc, the pickup 102 for reading out a signal from the rotating disc and the pickup driving portion 103 for sliding the pickup 102 in the radial direction of the disc are provided, and the pickup driving portion 103 is equipped with the lead screw 104 disposed along the radial direction of the disc, the guide shafts 105, 106 disposed in parallel to the lead screw 104, the pickup optical part support member 114 which is mounted on the guide shafts 105, 106 so as to be freely movable in the axial direction and on which the pickup 102 is mounted, the resin rack member main body 115A joined to the pickup optical part support member 114, the gear portion 115B which is provided to the rack member main body 115A so as to be freely tilted through the thin portion 115C and engaged with the lead screw 104, and the leaf spring 107 which is provided to the rack member main body 115A and urges the gear portion 115B to the lead screw 104. The leaf spring 107 is provided with the regulating portions 107D which are fitted to the rack member main body 115A and regulate the tilt angle of the gear portion 115B. Therefore, the regulating portions 107D prevent the gear portion 115B from being tilted through the thin portion 115C by a predetermined angle or more, and the creep deformation of the thin portion 115C due to the tilt of the gear portion 115B can be prevented.

Furthermore, the creep deformation by the leaf spring 107 can be suppressed to the minimum level, and thus the assemble work of the pickup driving portion 103 can be easily performed.

Furthermore, according to this embodiment, the leaf spring 107 has the contact portion 107C which comes into contact with the back surface of the gear portion 115B, and the regulating portions 107D are formed at both the side edges of the contact portion 107C. Therefore, the shape of the leaf spring 107 is simplified, and the leaf spring 107 can be easily formed. In addition, the work of assembling the leaf spring 107 to the rack member 115 can be made easy.

Still furthermore, according to this embodiment, the rack member main body 115A and the gear portion 115B are integrally formed of resin, so that the rack member 115 can be easily formed.

Figure 24:
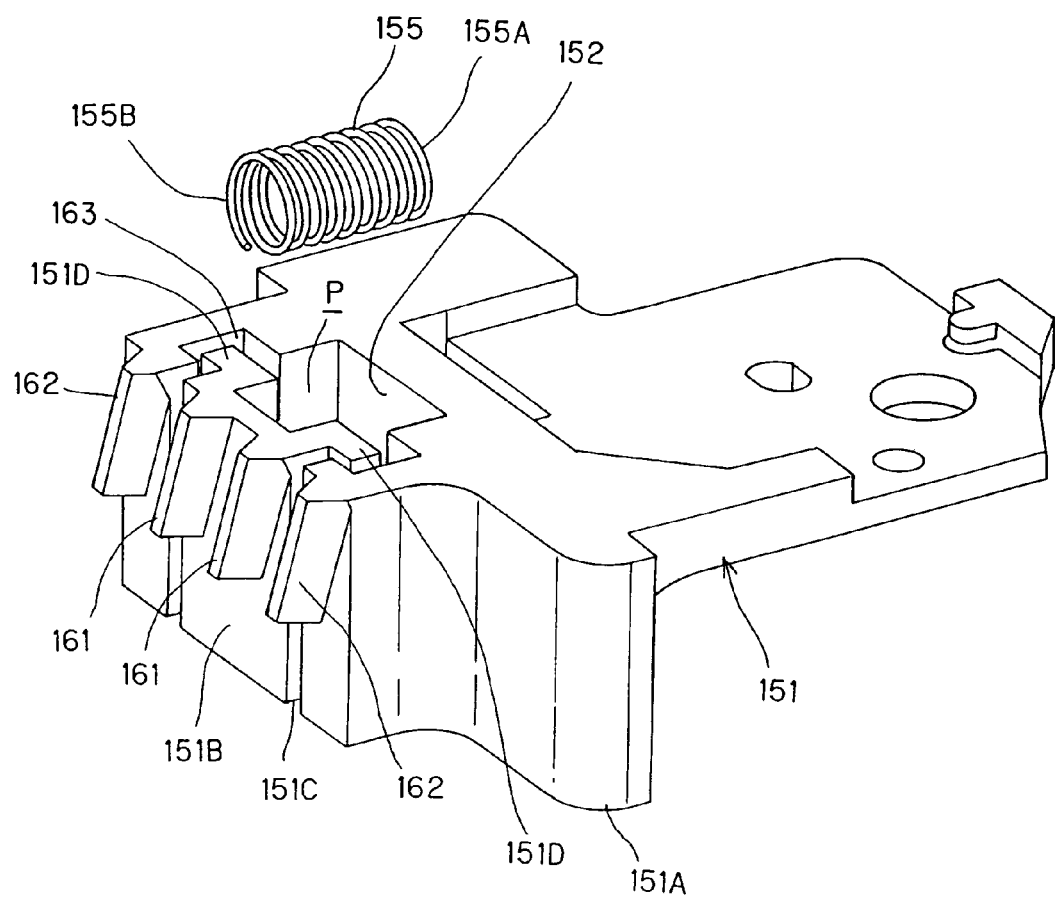
[FIG. 24] is an exploded perspective view of the rack member according to a modification example.
Figure 25:
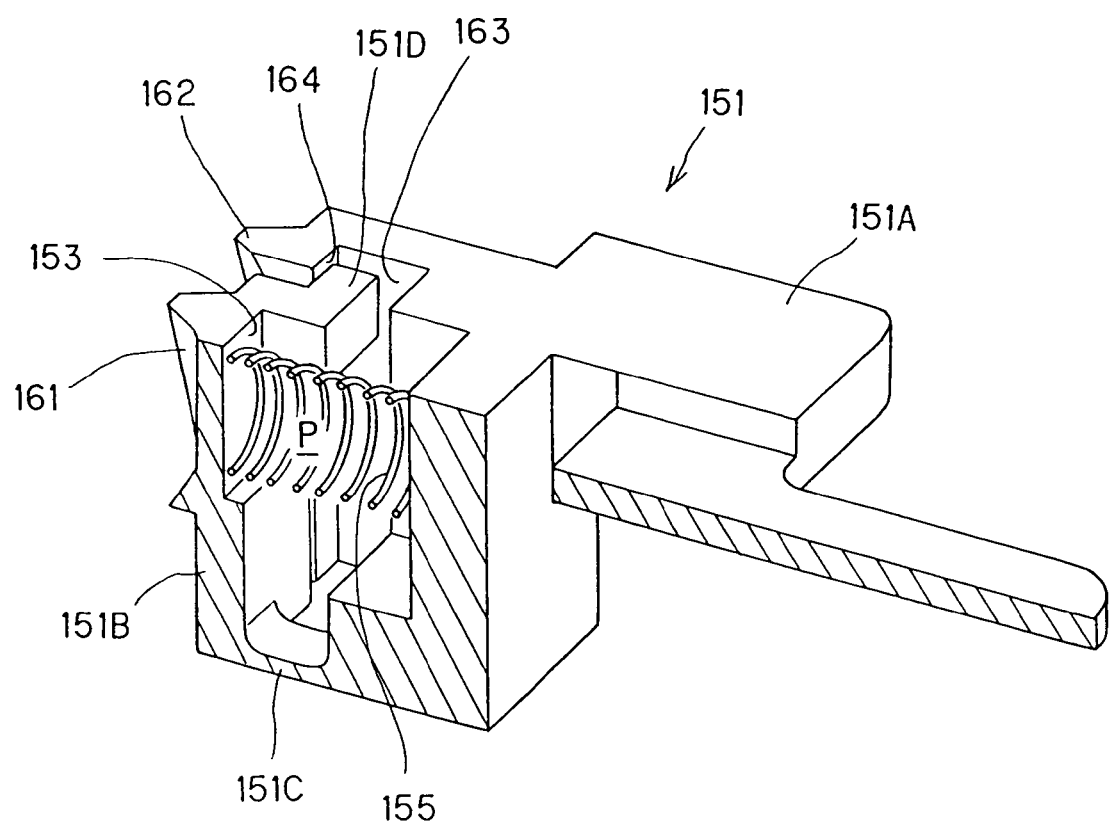
[FIG. 25] is a perspective view showing the cross-section of the rack member.

Next, a modification of the rack member will be described with reference to FIGS. 24 and 25. FIG. 24 is an exploded perspective view showing the rack member 151, and FIG. 25 is a perspective view showing the cross-section of the rack member 151. In this case, the constructions other than the rack member 151 are the same as described above, and thus the description thereof is omitted.

As shown in FIG. 24, the rack member 151 is equipped with a rack member main body (support member) 151A formed of resin, and a gear portion 151B disposed at the front surface side of the rack member main body 151a. Plural (two in this embodiment) projections 161 which are engaged with the lead screw 104 are formed on the front surface of the gear portion 151B. Second projections 162 which are aligned with the projections 161 are formed on the front surface of the rack member main body 151A. In this construction, the first projections 161 formed on the gear portion 151B function as movable teeth, and the second projections 162 formed on the rack member main body 151A function as fixed teeth.

As shown in FIG. 25, the lower end of the gear portion 151B is joined to the rack member main body 151A through the thin portion 151C. That is, the rack member 151 is integrally formed so as to have the rack member main body 151A and the gear portion 151B, and the gear portion 151B is constructed so as to be freely tilted through the thin portion 151C.

A space P is formed between the rack member main body 151A and the gear portion 151B, and a coil spring 155 for urging the gear portion 151 to the lead screw 104 is accommodated in this space P. One end 155A of the coil spring 155 comes into contact with the front surface 152 of the rack member main body 151A forming the space P, and the other end 155B thereof is fitted in the recess portion 153 formed on the back surface of the gear portion 151B.

In this construction, regulating portions 151D extending from both the side ends of the gear portion 151B of the rack member 151 are formed in the rack member 151, and also groove portions 163 in which the regulating portions 151D are mounted are formed in the rack member main body 151A. When the gear portion 151B is tilted through the thin portion 151C, the regulating portions 151D abut against the front surfaces 163A of the groove portions 163, thereby regulating the tilt angle of the gear portion 151B.

According to this construction, the drive unit 9 for rotating the disc, the pickup 102 for reading the signal from the rotating disc, and the pickup driving portion 103 for sliding the pickup 102 in the radial direction of the disc are provided, and the pickup driving portion 103 is equipped with the lead screw 104 disposed along the radial direction of the disc, the guide shafts 105, 106 disposed in parallel to the lead screw 104, the pickup optical part support member 114 which is mounted on the guide shafts 105, 106 so as to be freely movable in the axial direction and on which the pickup 102 is mounted, the rack member main body 151A of resin which is joined to the pickup optical part support member 114, the gear portion 151B which is provided to the rack member main body 151A so as to be freely tilted through the thin portion 151C and engaged with the lead screw 104, and the coil spring 155 which is provided to the rack member main body 151A and urges the gear portion 151B to the lead screw 104. The gear portion 151B is provided with the regulating portions 151D which are fitted to the rack member main body 151A to regulate the tilt angle of the gear portion 151B, whereby the regulating portions 151D prevent the gear portion 151B from being tilted through the thin portion 151C by a predetermined angle or more, and the creep deformation of the thin portion 151C due to the tilt of the gear portion 151 can be prevented.

Furthermore, the creep deformation by the coil spring 155 can be suppressed to the minimum level, and thus the assembling work of the pickup driving portion 103 can be easily performed.

Furthermore, according to this construction, the rack member main body 151A and the gear portion 151B are integrally formed of resin, and thus the rack member 151 can be easily formed.

In the above construction, the driving mechanism for the support member is applied to the mechanism for driving the pickup of the disc player. However, the present invention is not limited to this embodiment. For example, the driving mechanism may be applied to a mechanism for driving a head of a printer, or a mechanism for driving a movable lens of a camera such as a zooming lens, a focus lens or the like.

The invention claimed is:
1. A disc player in which a drive unit is supported inside a chassis while floating the drive unit and a disc is loaded to the drive unit to reproduce the disc and which is provided with a lock mechanism for releasing the floating of the drive unit at least under a disc eject or loading standby state to lock the drive unit to the chassis, wherein the drive unit comprises a base plate and a swing plate for pinching the disc in cooperation with the base plate, the lock mechanism comprises a first lock mechanism disposed at a first side of the drive unit and a second lock mechanism disposed at a second side of the drive unit, a driving mechanism driving the first lock mechanism and the swing plate is disposed at the first side of the drive unit, the second lock mechanism is disposed between the base plate and the swing plate, and the operation of the second lock mechanism is interlocked with the operation of the swing plate driven by the driving mechanism.

2. The disc player according to claim 1, wherein the second lock mechanism is unlocked interlockingly with a closing operation of the swing plate.

3. The disc player according to claim 1, wherein the second lock mechanism comprises a cam member and a lock member, the cam member is mounted on the base plate so as to be freely rotatable, gears are formed integrally with a base end and a free end of the cam member, the gear at the base end is engaged with a gear formed on the swing plate, the gear at the free end is engaged with a gear of the lock member, the lock member is freely rotatably mounted on the base plate, a free end of the lock member is projected from an opening formed in the swing plate, the free end is brought into contact with the back surface of the chassis to be locked, and the free end is turned down interlockingly with the closing operation of the swing plate.

4. The disc player according to claim 1, wherein the first lock mechanism is mounted in the drive unit so as to be disposed on the chassis and reciprocable in the forward and backward direction of the drive unit, the first lock mechanism is equipped with a trigger cam having a rack gear, a gear plate which is engaged with the rack gear of the trigger cam and swung interlockingly with the reciprocating motion of the trigger cam, a lock plate which reciprocates in the right-and-left direction of the drive unit interlockingly with the swing operation of the gear plate, and a lock piece provided to the lock plate, the trigger cam is moved in the forward and backward direction, the lock plate is reciprocated in the right-and-left direction to fit a fixed piece fixed to the drive unit into a groove, and the drive unit is locked to the chassis.

5. The disc player according to claim 4, wherein the rack gear extends in the forward and backward direction of the drive unit.

6. A disc player in which a drive unit is supported inside a chassis while floating the drive unit and a disc is loaded to the drive unit to reproduce the disc and which is provided with a lock mechanism for releasing the floating of the drive unit at least under a disc eject or loading standby state to lock the drive unit to the chassis, characterized in that the drive unit comprises a base plate and a swing plate for pinching the disc in cooperation with the base plate, the lock mechanism is disposed between the base plate and the swing plate, and the operation of the lock mechanism is interlocked with the operation of the swing plate, wherein the lock mechanism comprises a cam member and a lock member, the cam member is mounted on the base plate so as to be freely rotatable, gears are formed integrally with a base end and a free end of the cam member, the gear at the base end is engaged with a gear formed on the swing plate, the gear at the free end is engaged with a gear of the lock member, the lock member is freely rotatably mounted on the base plate, a free end of the lock member is projected from an opening formed in the swing plate, the free end is brought into contact with the back surface of the chassis to be locked, and the free end is turned down interlockingly with the closing operation of the swing plate.

7. A disc player in which a drive unit is supported inside a chassis while floating the drive unit and a disc is loaded to the drive unit to reproduce the disc and which is provided with a lock mechanism for releasing the floating of the drive unit at least under a disc eject or loading standby state to lock the drive unit to the chassis, characterized in that the drive unit comprises a base plate and a swing plate for pinching the disc in cooperation with the base plate, the lock mechanism is disposed between the base plate and the swing plate, and the operation of the lock mechanism is interlocked with the operation of the swing plate, wherein another lock mechanism is mounted in the drive unit so as to be disposed on the chassis and reciprocable in the forward and backward direction of the drive unit, the other lock mechanism is equipped with a trigger cam having a rack gear, a gear plate which is engaged with the rack gear of the trigger cam and swung interlockingly with the reciprocating motion of the trigger cam, a lock plate which reciprocates in the right-and-left direction of the drive unit interlockingly with the swing operation of the gear plate, and a lock piece provided to the lock plate, the trigger cam is moved in the forward and backward direction, the lock plate is reciprocated in the right-and-left direction to fit a fixed piece fixed to the drive unit into a groove, and the drive unit is locked to the chassis.

8. The disc player according to claim 7, wherein the rack gear extends in the forward and backward direction of the drive unit.

9. The disc player according to claim 7, wherein the other lock mechanism is disposed at one side of the drive unit.

10. The disc player according to claim 7, wherein the other lock mechanism is unlocked interlockingly with the closing operation of the swing plate.

* * * * *